(12) United States Patent
Broxton et al.

(10) Patent No.: US 9,658,443 B2
(45) Date of Patent: May 23, 2017

(54) OPTICS APPARATUS WITH DETECTION OF LIGHT RAYS RECEIVED AT DIFFERENT ANGLES FOR OUTPUT INDICATIVE OF ALIASED VIEWS

(71) Applicant: The Board of Trustees of the Leland Stanford Junior University, Palo Alto, CA (US)

(72) Inventors: Michael J. Broxton, San Francisco, CA (US); Marc S. Levoy, Stanford, CA (US); Noy Cohen, Stanford, CA (US); Logan Grosenick, San Francisco, CA (US); Samuel Yang, Stanford, CA (US); Karl A. Deisseroth, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 373 days.

(21) Appl. No.: 14/209,777

(22) Filed: Mar. 13, 2014

(65) Prior Publication Data
US 2014/0263963 A1    Sep. 18, 2014

Related U.S. Application Data

(60) Provisional application No. 61/798,636, filed on Mar. 15, 2013.

(51) Int. Cl.
G02B 21/36    (2006.01)
G02B 27/00    (2006.01)
(Continued)

(52) U.S. Cl.
CPC ....... *G02B 21/367* (2013.01); *G02B 27/0075* (2013.01); *H04N 5/225* (2013.01); *H04N 13/0232* (2013.01); *G02B 3/0006* (2013.01)

(58) Field of Classification Search
CPC .............................. B65H 2553/42; G01B 9/04
(Continued)

(56) References Cited

U.S. PATENT DOCUMENTS 7,491,928 B2    2/2009    Roichman et al.
7,567,596 B2    7/2009    Dantus et al.
(Continued)

OTHER PUBLICATIONS

Michael Broxton, Logan Grosenick, Samuel Yang, Noy Cohen, Aaron Andalman, Karl Deisseroth, and Marc Levoy, "Wave optics theory and 3-D deconvolution for the light field microscope," Opt. Express 21(21), 25418-25439 (2013).
(Continued)

*Primary Examiner* — Francis M Legasse, Jr.
(74) *Attorney, Agent, or Firm* — Crawford Maunu PLLC

(57) ABSTRACT

Images are detected in a manner that addresses various challenges as discussed herein. As may be consistent with one or more embodiments, aspects are directed to an apparatus having sets of photosensors that detect light rays received at different angles from a specimen via a microlens array, with the light rays detected by each set of photosensors representing an aliased view of the specimen. An output indicative of aliased views of the specimen is provided. Certain embodiments further include a logic circuit that processes the output and generates a deconvolved volume image by combining aliased views of the specimen as detected by the photosensors.

16 Claims, 17 Drawing Sheets

(51) Int. Cl.
*H04N 13/02* (2006.01)
*H04N 5/225* (2006.01)
*G02B 3/00* (2006.01)

(58) Field of Classification Search
USPC ...... 250/208.1, 216, 330, 332, 338.1, 338.5,
250/339.02, 339.07, 339.11, 340, 559.01,
250/559.04, 559.05, 559.07, 559.08,
250/559.11, 559.16, 559.17,
250/559.2–559.22, 559.39, 559.4–559.49;
359/368–398, 577–590, 656–661, 721,
359/754; 356/51, 300–343, 450–521,
356/402–425, 432–448, 237.1–241.6
See application file for complete search history.

(56) References Cited

U.S. PATENT DOCUMENTS

| | | | |
|---|---|---|---|
| 7,723,662 | B2 | 5/2010 | Levoy et al. |
| 7,897,910 | B2 | 3/2011 | Roichman et al. |
| 7,973,936 | B2 | 7/2011 | Dantus |
| 8,300,669 | B2 | 10/2012 | Dantus et al. |
| 2004/0012872 | A1 | 1/2004 | Fleming et al. |
| 2006/0056468 | A1 | 3/2006 | Dantus |
| 2006/0187974 | A1 | 8/2006 | Dantus |
| 2007/0139784 | A1 | 6/2007 | Roichman et al. |
| 2008/0204733 | A1* | 8/2008 | Jones ............... G01N 21/21 356/237.1 |
| 2008/0266655 | A1* | 10/2008 | Levoy ............... G02B 21/361 359/368 |
| 2009/0146050 | A1 | 6/2009 | Roichman et al. |
| 2009/0257464 | A1 | 10/2009 | Dantus et al. |
| 2010/0204459 | A1 | 8/2010 | Mason et al. |
| 2013/0250099 | A1* | 9/2013 | Iijima ............... G01M 11/0271 348/135 |
| 2013/0280752 | A1* | 10/2013 | Ozcan ............... G01N 21/4795 435/29 |
| 2014/0078333 | A1* | 3/2014 | Miao ............... H04N 5/23212 348/222.1 |
| 2014/0263963 | A1 | 9/2014 | Broxton et al. |
| 2015/0055745 | A1 | 2/2015 | Holzner et al. |

OTHER PUBLICATIONS

S. Prasad, "Rotating point spread function via pupil-phase engineering," Opt. Lett. 38(4), 585-587 (2013) Abstract Only.
D. A. Agard, "Optical sectioning microscopy: cellular architecture in three dimensions," Annual review of biophysics and bioengineering 13, 191-219. (1984). First Page Only.
I. J. Cox and C. J. R. Sheppard, "Information capacity and resolution in an optical system," J. Opt. Soc. Am. A 3, 1152 (1986). Abstract Only.
M. Pluta, Advanced Light Microscopy, vol. 1. Principles and Basic Properties, (Elsevier, 1988). (Biblio included)—(464 page book).
M Levoy and P Hanrahan. Light field rendering. Proceedings of the 23rd annual conference on Computer graphics and interactive techniques, pp. 31-42, 1996.
J. Goodman, Introduction to Fourier Optics, 2nd ed. (MaGraw-Hill, 1996). —(457 page book).
M. Bertero and C. de Mol, "III Super-resolution by data inversion," in Progress in Optics (Elsevier, 1996) pp. 129-178. —(cover page of book included).
M. Born and E. Wolf, Principles of Optics, 7th ed. (Cambridge University, 1999). Book description included.
M. Gu, Advanced Optical Imaging Theory (Springer, 1999). Book description included.
P Nussbaum, R Völkel, H P Herzig, M Eisner, and S Haselbeck. Design, fabrication and testing of microlens arrays for sensors and microsystems. Pure and Applied Optics: Journal of the European Optical Society Part A, 6(6):617, 1997.

A. Egner and S. W. Hell, "Equivalence of the Huygens—Fresnel and Debye approach for the calculation of high aperture point-spread functions in the presence of refractive index mismatch," Journal of Microscopy 193, 244-249 (1999).
S. Baker and T. Kanade, "Limits on super-resolution and how to break them," IEEE Trans. Pattern Anal. Mach. Intell. 24. 1167-1183 (2002).
M. R. Arnison and C. J. R. Sheppard, "A 3D vectorial optical transfer function suitable for arbitrary pupil functions," Optics communications 211, 53-63 (2002).
S. Farsiu, D. D Robinson, M. Elad, and P. Milanfar. Advances and challenges in super-resolution. International Journal of Imaging Systems and Technology, 14(2):47-57, 2004.
R. Ng, "Fourier slice photography," in Proceedings of ACM SIGGRAPH (2005). 735-744.
T. Pham, L. van Vliet, and K. Schutte, "Influence of signal-to-noise ratio and point spread function on limits of superresolution," Proc. SPIE 5672,169-180 (2005).
M. Levoy, R. Ng, A. Adams, M. Footer, and M. Horowitz, "Light field microscopy," in Proceedings of ACM SIGGRAPH. (2006) 924-934.
J. M. Bardsley and J. G. Nagy, "Covariance-preconditioned iterative methods for nonnegatively constrained astronomical imaging," SIAM journal on matrix analysis and applications 27, 1184-1197 (2006).
W. Chan, E. Lam, M. Ng, and G. Mak, "Super-resolution reconstruction in a computational compound-eye imaging system," Multidimensional Systems and Signal Processing 18. 83-101. (2007).
R. Niesner, V. Andresen, J. Neumann, and H. Spiecker, "The Power of Single and Multibeam Two-Photon Microscopy for High-Resolution and High-Speed Deep Tissue and Intravital Imaging", Biophysical Journal, vol. 93, Issue 7, p. 2519-2529, Oct. 2007.
Werner Göbel, Björn M Kampa, and Fritjof Helmchen, "Imaging cellular network dynamics in three dimensions using fast 3D laser scanning". Nature Methods, 4(1):73-79, 2007.
R. Heintzmann, "Estimating missing information by maximum likelihood deconvolution," Micron 38, 136-144 (2007).
T. F. Holekamp, T. Turaga, and T. E. Holy, "Fast Three-Dimensional Fluorescence Imaging of Activity in Neural Populations by Objective-Coupled Planar Illumination Microscopy", Neuron, 57(5):661-672, 2008.
R. Oldenbourg. "Polarized light field microscopy: an analytical method using a microlens array to simultaneously capture both conoscopic and orthoscopic views of birefringent objects". Journal of Microscopy, 231(3):419-432, 2008.
G. D. Reddy, K. Kelleher, R. Fink, and P. Saggau, "Three-dimensional random access multiphoton microscopy for imaging maging of neuronal activity", Nature Neuroscience, 11(6):713-720, 2008.
M. Bertero, P. Boccacci, G. Desidera, and G. Vicidomini, "Image deblurring with Poisson data: from cells to galaxies," Inverse Problems 25,123006 (2009).
M Levoy, Z Zhang, and I McDowell. Recording and controlling the 4D light field in a microscope using microlens arrays. Journal of Microscopy, 235(2):144-162, 2009.
Michael Bass and Virendra N. Mahajan. Handbook of Optics. Third Edition. McGrew-Hill, New York, 2010. Copy Not Available—(1000+ page book).
K. Grochenig and T. Strohmer, "Numerical and theoretical aspects of nonuniform sampling of band-limited images, in Nonuniform Sampling," , F. Marvasti, ed.. Information Technology: Transmission, Processing, and Storage, 283-324 (Springer US, 2010).
Joseph Rosen, Nisan Siegel, and Gary Brooker. Theoretical and experimental demonstration of resolution beyond the Rayleigh limit by FINCH fluorescence microscopic imaging. 19(27):1506-1508, 2011.
T. Bishop and P. Favaro. The Light Field Camera: Extended Depth of Field, Aliasing and Super-resolution. Pattern Analysis and Machine Intelligence, IEEE Transactions on, (99):1-1, 2012.
D. Voelz, Computational Fourier Optics: a MATLAB Tutorial (SPIE Press, 2011). (book description included).
P. Favaro, "A split-sensor light field camera for extended depth of field and superresolution," in "SPIE Conference Series," 8436. (2012). Abstract Only.

(56) References Cited

OTHER PUBLICATIONS

S. Abrahamsson, J. Chen, B. Hajj, S. Stallinga, A. Y. Katsov, J. Wisniewski, G. Mizuguchi, P. Soule, F. Mueller, C. D. Darzacq, X. Darzacq, C. Wu, C. I. Bargmann, D. A. Agard, M. G. L. Gustafsson, and M. Dahan, "Fast multicolor 3D imaging using aberration-corrected multifocus microscopy," Nat. Meth. 1-6. (2012). Abstract Only.

S. Shroff and K. Berkner, "Image formation analysis and high resolution image reconstruction for plenoptic imaging systems," Applied optics, 52, D22D31, (2013).

C. H. Lu, S. Muenzel, and J. Fleischer, "High-resolution light-field microscopy," in "Computational Optical Sensing and Imaging, Microscopy and Tomography I (CTh3B)," (2013). Abstract Only.

* cited by examiner

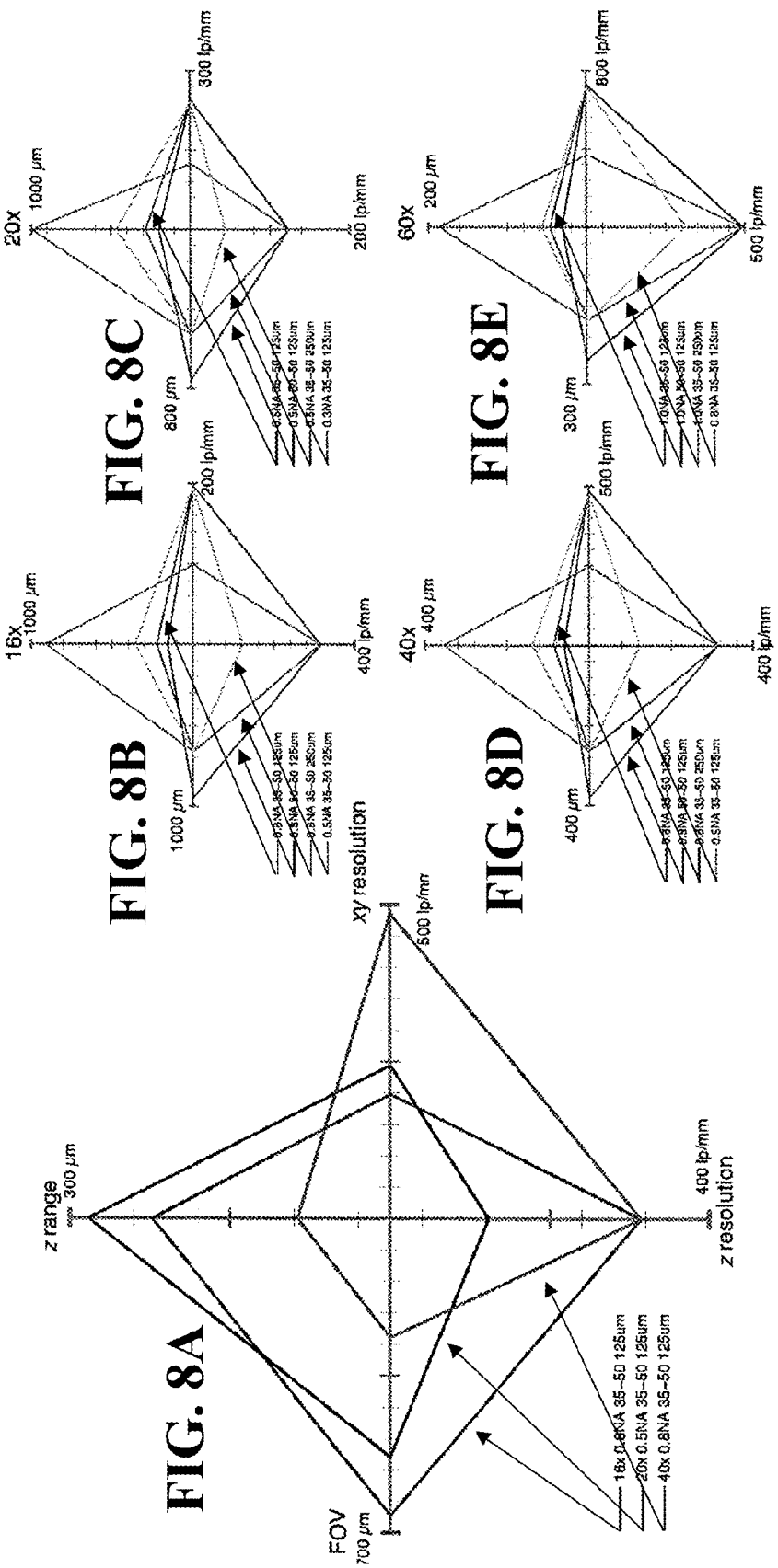

FIG. 10A
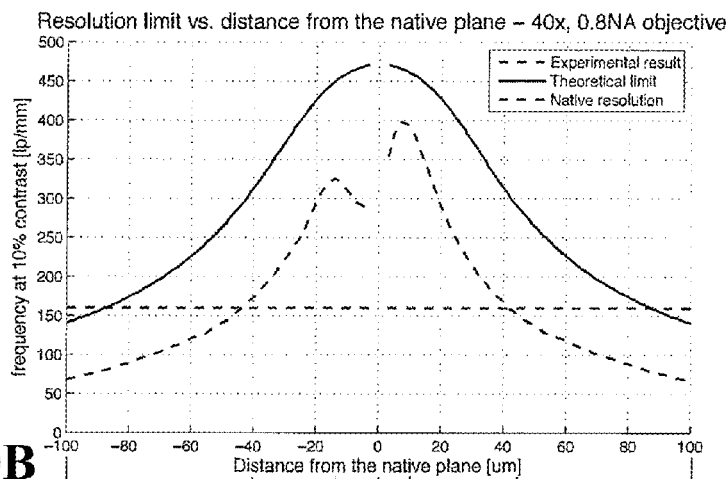
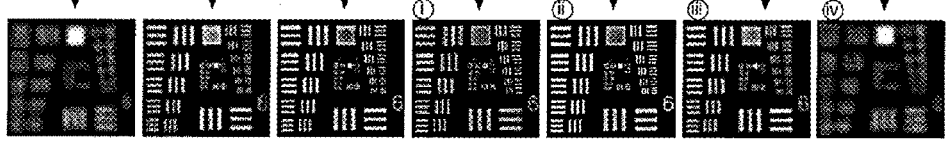
FIG. 10B
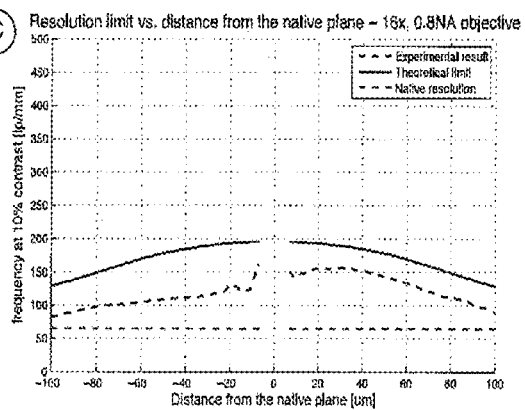
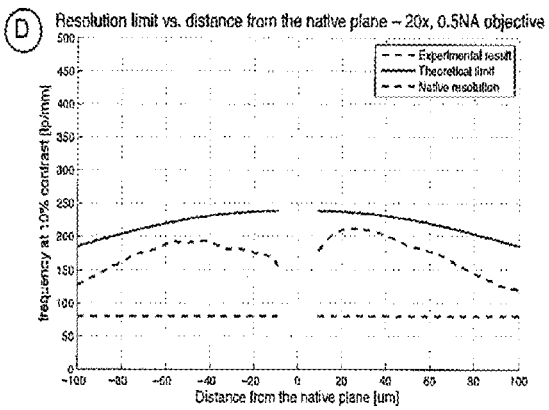
FIG. 10C  FIG. 10D

OPTICS APPARATUS WITH DETECTION OF LIGHT RAYS RECEIVED AT DIFFERENT ANGLES FOR OUTPUT INDICATIVE OF ALIASED VIEWS

FEDERALLY-SPONSORED RESEARCH AND DEVELOPMENT

This invention was made with Government support under contracts 0964218 and 0964204 awarded by the National Science Foundation. The Government has certain rights in this invention.

FIELD

Aspects of various embodiments are directed to tomographic imaging, such as tomographic imaging using aliased views.

BACKGROUND

A variety of imaging approaches are used in different fields. For instance, light field microscopy is an inexpensive, flexible and fast technique for volumetric imaging. A light field microscope (LFM) can be built from any fluorescence microscope by adding an inexpensive microlens array at the intermediate image plane. The lenslet array decomposes incoming light, focusing it onto the image sensor so that light at different field positions and ray angles are recorded by separate sensor pixels. This rich spatio-angular information, captured in a snapshot at a single instant in time, is a discrete representation of the so-called light field where radiance along rays is measured as a function of position and direction in space. Computational processing of a light field micrograph can yield data products of interest to the microscopist, including images with computationally adjustable focal plane and depth of field, or pinhole views from any direction within the microscope's NA that allow one to see behind occluding objects.

Although light field imaging yields great flexibility in post-processing, recording light through the microlens array may result in sacrificing lateral spatial resolution in order to record angular information. For example, while it can be desirable to record many ray angles (e.g., more than 10 in each dimension of the image), the loss of resolution is proportional to the number of discrete ray angles collected. This represents a considerable resolution loss relative to diffraction-limited performance. These and other matters have presented challenges to imaging, for a variety of applications.

SUMMARY

Various example embodiments are directed to imaging apparatuses, methods and their implementation.

According to an example embodiment, an apparatus includes an objective lens, a microlens array and a photosensor array including respective sets of photosensors. The sets of photosensors detect light rays received at different angles from a specimen via the objective lens and microlens array, in which the light rays detected by each set of photosensors represent an aliased view of the specimen. The photosensors provide an output indicative of aliased views of the specimen useful for processing by a logic circuit.

Another example embodiment is directed to a method in which light rays are detected, via respective sets of photosensors, as received at different angles from a specimen via an objective lens and microlens array. The light rays detected by each set of photosensors represent an aliased view of the specimen. An output that is indicative of the aliased views of the specimen is provided, and which is useful for processing by a logic circuit. In some implementations, a deconvolved volume image of the specimen is reconstructed by combining ones of the aliased views based upon both the overlapping light rays from the different angles in the volume and the angles at which the overlapping light rays are detected.

Another embodiment is directed to an apparatus including respective sets of photosensors and a logic circuit that receives an output(s) of the photosensors. Each set of photosensors detects light rays received at different angles from a specimen via different microlenses in a microlens array. The light rays detected by each set of photosensors represent an aliased view of the specimen. An output indicative of aliased views of the specimen is provided to the logic circuit, which reconstructs a deconvolved volume image of the specimen by combining the aliased views detected by the sets of photosensors, based upon both the overlapping light rays from the different angles in the volume and angles at which the respective light rays are received at the photosensors.

Various embodiments are directed to addressing challenges such as those discussed in the background above. In certain embodiments, under mild assumptions of non-scattering in fluorescent samples, spatial resolution is recovered along with a fully deconvolved 3D volume using limited-angle tomography. This light field "super-resolution" is achieved using each projection through the volume at any single angle as being under-sampled as compared to the spatial band-limiting blurring induced by the lenslet array and sensor pixels. Although this results in aliasing in a view from any single angle, the frequent but irregular pattern of overlapping light rays from different angles in the volume increases the effective spatial sampling rate, making it possible to combine aliased views and reconstruct a super-sampled volume up to a limit determined by the band-limiting blurring induced by the pitch, shape and fill factor of the lenslet array and sensor pixels. This intuition is used in an optical model for the LFM, having a point spread function that varies as a function of position and depth in the sample. In certain cases, limits on the resolution of the LFM are exceeded by incorporating prior knowledge (e.g., regularization) in a graphics processing unit GPU-accelerated tomography algorithm.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 8A shows a spider chart, in accordance with one or more embodiments;

FIGS. 8B-8E show performance parameters across different objective magnifications, in accordance with one or more embodiments in which FIG. 8B shows a 16× objective magnification,
FIG. 8C shows a 20× objective magnification,
FIG. 8D shows a 40× objective magnification, and
FIG. 8E shows a 6o× objective magnification;

FIGS. 9A-9E show lateral resolution performance using a USAF 1951 target with 20×0.5NA water dipping objective, in accordance with one or more embodiments in which FIG. 9A depicts a fluorescence microscope,
FIG. 9B is an LFM used for computational refocusing at different z-depths,
FIG. 9C shows results from using a super-resolution deconvolution method,
FIG. 9D shows refocusing 4×, and
FIG. 9E shows 4× super-resolution deconvolved images;

FIGS. 10A-10D depict experimentally characterized lateral resolution as a function of z-depth, in accordance with one or more embodiments in which FIG. 10A shows the native resolution,
FIG. 10B shows a 1951 USAF resolution target,
FIG. 10C shows resolution limit versus distance for a 16×, 0.8 NA objective, and FIG. 10D shows resolution limit versus distance for a 16×, 0.8 NA objective;

Figure 1:
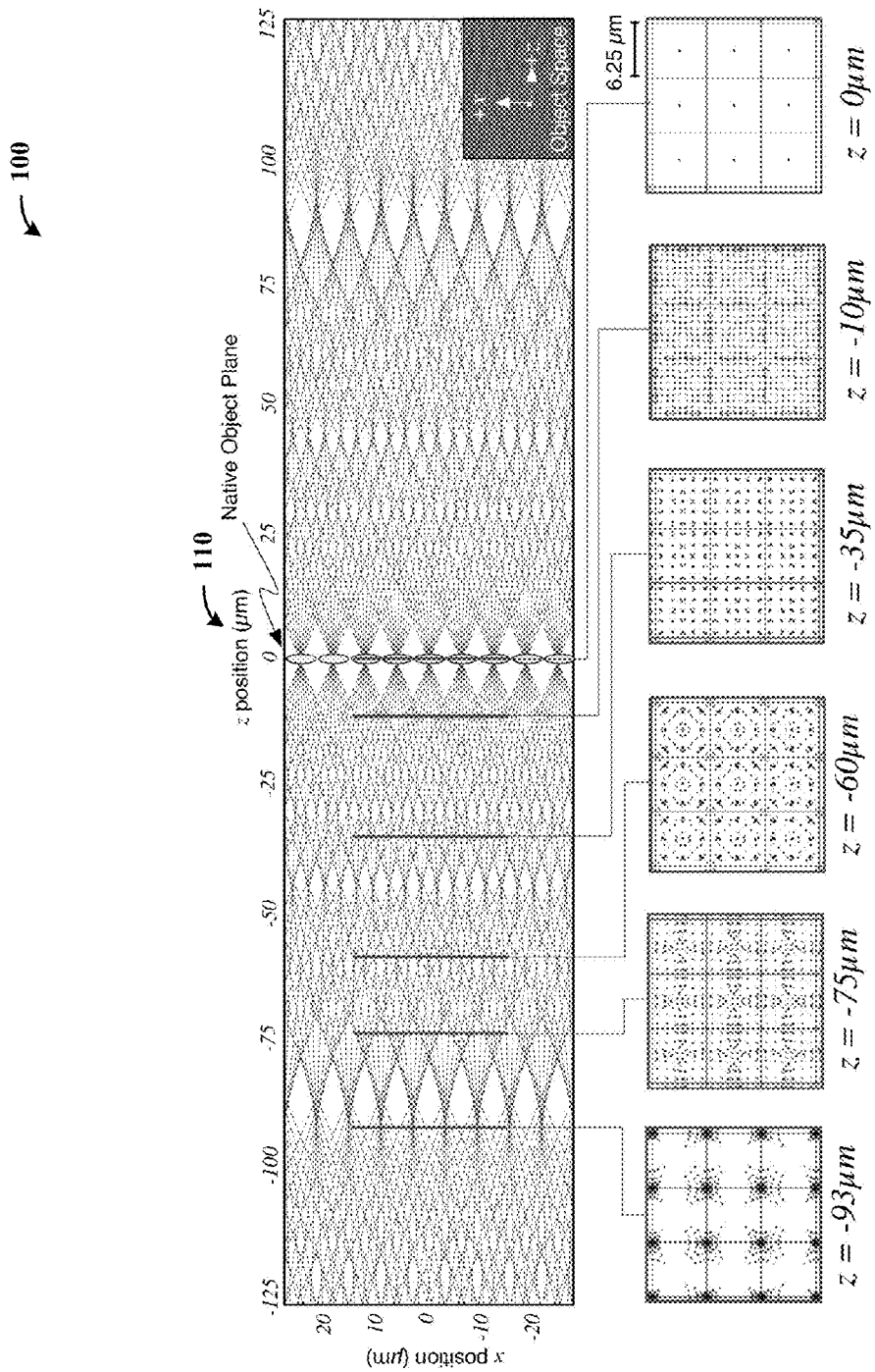
FIG. 1 shows an approach for the generation of a deconvolved volume image, in accordance with an embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving imaging using aliased views of a specimen. While not necessarily so limited, various aspects may be appreciated through a discussion of examples using this context.

Various example embodiments are directed to methods and apparatuses in which respective sets of photosensors are used to detect light rays from a specimen, with the light rays being received at different angles and passed via different microlenses. The detected light rays at each set of photosensors represents an aliased view of the specimen, and the aliased views are used to reconstruct a deconvolved volume image of the specimen. Specifically, the aliased views are combined based upon the overlapping light rays from the different angles in the volume, and angles at which the respective light rays are received at the photosensors. Such reconstruction may be implemented, for example, by a logic circuit such as a computer type circuit connected to receive an output of the photosensors.

Another embodiment is directed to an apparatus including an objective lens, a microlens array, and a photosensor array. The photosensor array has respective sets of photosensors that detect, from a specimen to be imaged, light rays passed to the photosensors via the objective lens and microlens array at different angles. The light rays detected by each set of photosensors represent an aliased view of the specimen, and the photosensor array outputs data representing these aliased views of the specimen.

In certain embodiments, the apparatus further includes a logic circuit such as a computer processor circuit that generates a deconvolved volume image of the specimen by combining the aliased views, based upon the overlapping light rays from the different angles in the volume. The logic circuit may be configured with various operations/features to suit particular applications and for various embodiments. In some embodiments, the logic circuit encodes a forward projection of the deconvolved volume image to a four-dimensional light field image that varies as a function of position and depth in the volume. In certain embodiments, the logic circuit increases an effective spatial sampling rate of the deconvolved volume image up to a limit set by the diffraction of light and the effective spatial and angular sampling rate of the apparatus. In some embodiments in which the light rays overlapping the photosensor array in an irregular pattern in which different ones of the light rays are spaced from one another at different distances, the logic circuit reconstructs the deconvolved volume image by using the overlapping light rays to increase an effective spatial sampling rate of the light rays relative to an actual sampling rate at which the photosensor detects the light rays. In some embodiments in which images detected by each set of photosensors are out of focus, the logic circuit reconstructs the deconvolved volume image using the overlapping light rays to mitigate out of focus characteristics of the respective images upon reconstruction of the deconvolved volume image, by combining the respective out of focus images. In still other embodiments, the logic circuit compute deconvolved volume images by, for each image, combining data indicative of ones of the detected light rays that correspond to aliased views of the specimen, based upon respective angles at which the ones of the detected light rays are received.

In further embodiments, the microlens array includes a plurality of microlenses and a coating on at least a portion of each microlens. The processor reconstructs the deconvolved volume image by localizing point sources, using each coating to decrease the effective width of back-projected light rays by blocking a portion of the light rays.

In certain embodiments, the logic circuit computes a deconvolved volume image of the specimen using data indicative of the detected light rays including at least one of optical aberrations, diffraction and aliasing produced by at least one of the objective lens, microlens array, and photosensor array. In other embodiments, the logic circuit computes a deconvolved volume image of the specimen using data indicative of at least one of angular and spatial characteristics of the detected light rays.

In other embodiments, the photosensor array includes two or more photosensor arrays that detect the light rays at the different angles using at least two light paths respectively including different microlenses in the microlens array. When implemented with a logic circuit, the light rays detected by each of the photosensor arrays are used by the logic circuit to construct a deconvolved volume image.

In accordance with another example embodiment, an imaging method involves detecting, via respective sets of photosensors, light rays received at different angles from a specimen via an objective lens and microlens array. The light rays detected by each set of photosensors represent an aliased view of the specimen. An output is provided which is indicative of aliased views of the specimen and useful for processing by a logic circuit. In some implementations, a deconvolved volume image of the specimen is constructed (e.g., reconstructed via the light rays) by combining ones of the aliased views based upon the overlapping light rays from the different angles in the volume, and upon the angles at which the overlapping light rays are detected. In some implementations, a forward projection of the deconvolved volume image is encoded to a four-dimensional (4D) light field image that varies as a function of position and depth in the volume.

Reconstructing the deconvolved volume image includes one or more of a variety of approaches. In some embodiments, reconstructing the deconvolved volume image includes combining data indicative of overlapping light rays to increase an effective spatial sampling rate of the deconvolved volume image. This increase can be carried out up to a limit set by the diffraction of the light rays and the effective spatial and angular sampling rate at which the light rays are detected. In other embodiments, the deconvolved volume image is reconstructed using overlapping light rays to increase an effective spatial sampling rate of the light rays, relative to an actual sampling rate at which the light rays are detected. The light rays overlap the photosensors in an irregular pattern in which different ones of the light rays are spaced from one another at different distances.

The light rays are detected in one or more of a variety of manners. In some embodiments, light rays that are out of focus are detected, and overlapping light rays are used to mitigate out of focus characteristics of the deconvolved volume image (upon reconstruction) by combining the respective out of focus images. In other embodiments, respective sets of light rays are detected at different angles using at least two light paths respectively including different microlenses, and the deconvolved volume image is reconstructed using aliased views corresponding to light rays detected via each of the light paths.

In accordance with various embodiments and referring to FIG. 1 by way of example, approaches involving the generation of a deconvolved volume image via microlenses 110 are implemented to recover spatial resolution that is lost via sampling light rays at different angles, while also reconstructing the fully deconvolved 3D volume using limited-angle tomography. This light field "super-resolution" is facilitated as the rays projecting through the light field volume are frequently overlapped with each other at non-uniform intervals, resulting in a sampling pattern within the volume, as shown in FIG. 1, that lends itself to super-resolution techniques. By way of example, the insets in FIG. 1 show light rays are shown at different distances "Z" from the microlenses 110. In various implementations, fluorescence microscopy is employed in which objects are assumed to be transparent such that light emitted at points in the volume travels in straight lines without scattering. In this case, super-resolution can be obtained by a simple extension of tomographic reconstruction.

Various embodiments are implemented in a manner consistent with one or more aspects of a forward, linear model of an imaging process. Various discussion as follows characterizes solving such a linear model as an inverse problem, and two reconstruction methods for solving it are described which may be implemented accordingly. One such approach is based on the Simultaneous Iterative Reconstruction Technique (SIRT) algorithm, and the other is based on an Approximate Message Passing (AMP) algorithm that can incorporate TV regularization. Trade-offs in optical parameters can change the light field sampling process and influence limits.

Figure 2:
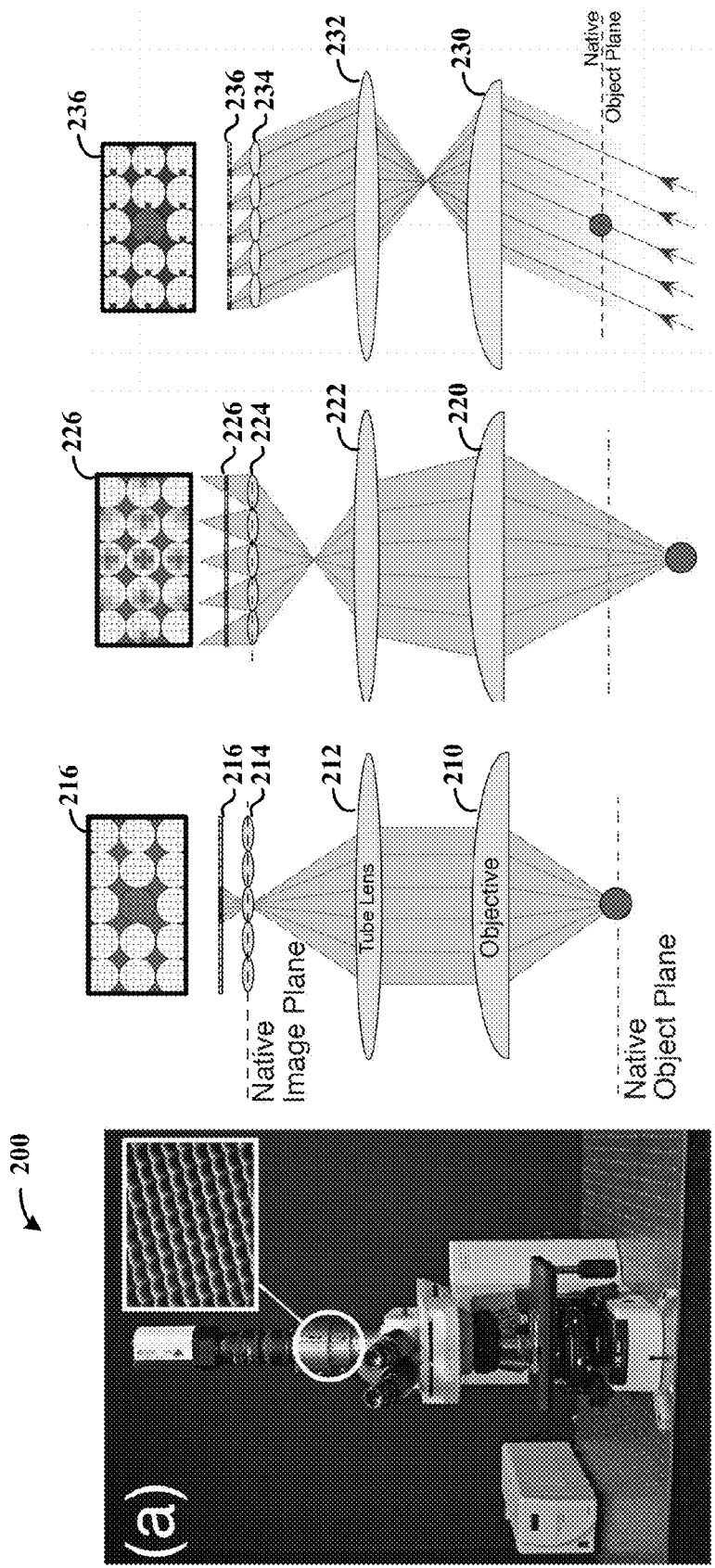
FIG. 2A shows a light field microscope, in accordance with an example embodiment.
FIG. 2B shows a bundle of rays emanating from a theoretical point source at a native plane, as may be implemented in accordance with one or more embodiments.
FIG. 2C shows light collected from a point emitter below a native plane, as may be implemented in accordance with another embodiment.
FIG. 2D illustrates rays collected by a photosensor that pass at one particular angle through the volume, as may be implemented in accordance with another example embodiment.

The above approaches may be implemented with a LFM arrangement as may be consistent with that shown in FIG. 2A, which shows a microscope with a microlens array at an imaging plane as discussed with one or more embodiments herein. A camera sensor may be focused behind the microlens array at a distance of one lenslet focal length—e.g., 1 to 10-mm. This leaves little room for placing and focusing the lenslet array, but a relay lens system can be placed in front of the camera sensor to provide additional space and flexibility. A pair of 50 mm photographic lenses mounted nose-to-nose can be implemented in this regard.

FIG. 2B shows a bundle of rays emanating from a theoretical point source at the native plane under the LFM, in accordance with another embodiment. Light rays from the point pass via an objective lens 210, tube lens 212 and microlens array 214 to a sensor 216, which is also shown in an alternate top view. Rays at different angles that fall within the NA are recorded by separate pixels on the sensor 216. Summing the pixels in the focus area as shown, yields the same measurement that would have been made if the camera sensor itself had been placed at the image plane. That is, summing the pixels behind each lenslet sub-image yields an image focused at the native plane, albeit with reduced lateral resolution equal in this case to the diameter of one lenslet.

FIG. 2C shows light that is collected from a point emitter below the native plane, in accordance with another embodiment. Light rays from the point pass via an objective lens 220, tube lens 222, and microlens array 224 to a photosensor 226, which is also shown in an alternate top view as with FIG. 2B. The light is focused in a pattern of spots on the sensor behind each lenslet. This pattern, which spreads out as the point moves further from the principal plane, is referred to as the discrete light field point spread function (lf-PSF). Here too, the pixels may be summed (weighting each summand by its relative intensity in the lf-PSF) to produce a computationally refocused image. Computing the lf-PSF for different depths, it is possible to create a synthetic focal stack from a single light field image acquired by the camera. The synthetic focal stack suffers from the well-known limitation that each z-plane contains light from points that are in focus (in that plane), as well as light from points that are out of focus (from other planes). As such, the lf-PSF can be used to perform full 3D deconvolution, producing a reconstructed 3D volume in which each z-plane has been "computationally" sectioned from others above it and below it.

FIG. 2D illustrates a 3D deconvolution process as about equivalent to solving a limited-angle tomography problem, with bundles of rays forming a parallel projection through the sample at the same oblique angle being collected by the pixels on the left-most side of each lenslet. Light rays from the point pass via an objective lens 230, tube lens 232 and microlens array 234 to a photosensor 236, which is also shown in an alternate top view as with FIG. 2B. A light field with N×N pixels behind each lenslet will contain projections at $N^2$ different angles that span the NA of the microscope objective. Light is not collected precisely along parallel projections in the volume, as ray bundles spread out with increasing distance from the native plane, and their shape is influenced by the effects of diffraction as it passes through the lenslet aperture.

A variety of microlens arrays can be implemented with a LFM. To ensure that the microlens array collects the full range of angles collected by a given imaging objective, the f-number of the microlens array can be chosen to match the NA of the objective. The working f-number of an objective can be computed from its magnification M and its NA as $$N_w = \frac{1+M}{2NA} \quad (1)$$

The f-number of the lenslet array is chosen to match this working f-number as closely as possible. In general an array may be slightly underfilled instead of overfilling it so that the lenslet sub-images do not overlap on the camera sensor.

Correct focusing of the camera behind the microlens array is carried out for reconstruction. If the microscope is equipped with transillumination, a phase ring may be placed at the aperture plane in the condenser lens assembly, and the camera is translated back from the image plane until the phase annulus comes into sharp focus. This focuses the lenslet sub-images on the microscope's back aperture plane, which occurs when the microlens-to-sensor focal distance is equal to $f_{lenslet}$. One can also focus both the microlens array and image sensor at the native plane, and then use a micromanipulator to translate the sensor back by exactly one lenslet focal length.

Figure 13A:
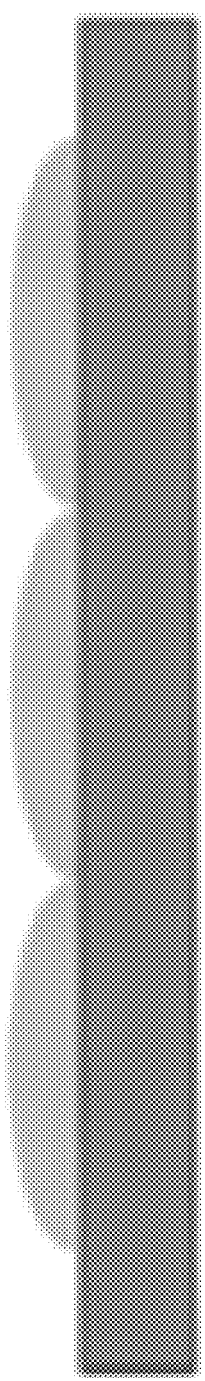
FIG. 13A shows a microlens array without a coating, in accordance with another embodiment.
Figure 13B:
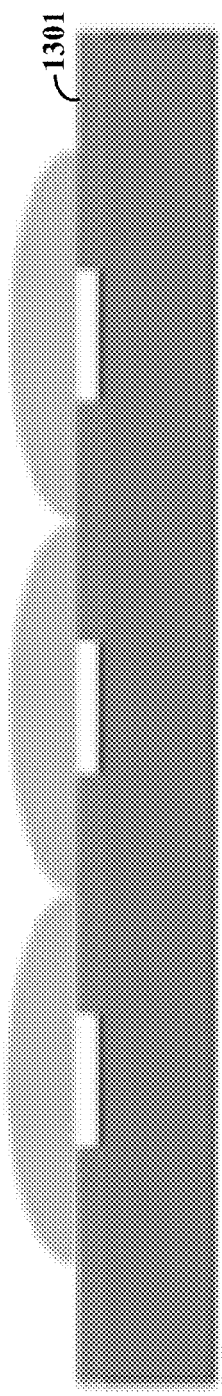
FIG. 13B shows another embodiment of the present disclosure in which a coating is applied to a bottom, flat portion of microlenses.
Figure 13C:
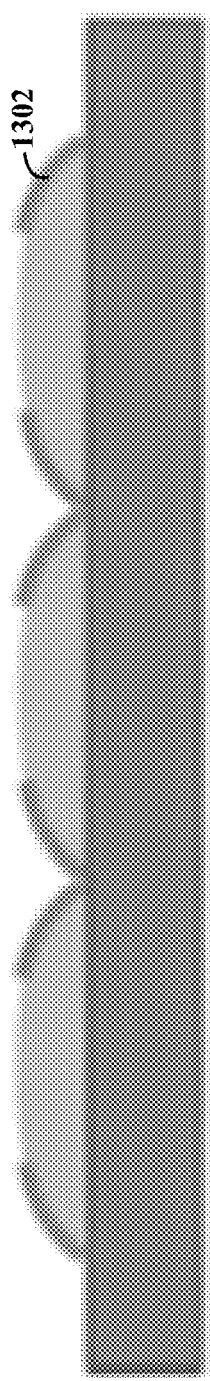
FIG. 13C shows a masking-type approach, in accordance with another embodiment.

In another embodiment of the present disclosure, the microlens array used in the LFM is implemented using a masked microlens array, in which the microlenses' aperture size is stopped down by a certain factor with a masking-type material. In some embodiments, a portion of each microlens is coated with a material such as a reflective or absorptive coating material that effectively blocks light rays from exiting or entering the microlens array where coated. Referring to FIG. 13A, a microlens array is shown without a coating. FIG. 13B shows another embodiment of the present disclosure in which a coating 1301 is applied to the bottom, flat portion of the microlenses. FIG. 13C shows a masking-type embodiment of the present disclosure in which a coating 1302 is applied on the top, curved portion of the microlenses.

The shape of the microlens aperture, created by the coating, is controlled by the shape of the coating. In some embodiments, a circular aperture is created by applying a coating over the microlens, leaving a non-coated circular portion in the middle of the microlens with a certain radius. In another embodiment, a rectangular aperture is created by applying a coating so that a rectangular clear area is left uncoated in the middle of the microlens. The coating material that may be used to create the aperture on the microlens includes any material with light reflective or absorptive properties, including, as an exemplary embodiment, chrome.

Various embodiments are directed to stopping down the microlens aperture to affect the optical resolution and light efficiency of the LFM in one or more of a variety of manners. Two exemplary factors that are used to affect the resulting spatial resolution are the effective width of the captured light projected back into the volume from the light field pixels, and diffraction effects due to the microlens aperture size. The aperture is stopped down to decrease the effective width of the backprojected light rays, thus providing localization of point sources during volume reconstruction, thereby leading to improved spatial resolution. In some implementations, the stopping down is effected in accordance with a trade-off of diffraction effects that can become more significant as the aperture is stopped down, and a limit to achievable resolution gain as diffraction effects begin to dominate the size of the projected image behind the lenslets. In some implementations, the aperture of the microlenses is stopped down by an intermediate amount that results in little or no severe diffraction effects, and may result in increased spatial resolution, helping to alleviate lateral resolution degradation that can be associated with the LFM.

In some embodiments, the camera pixels are exposed for a longer period of time (e.g., within limitations of the desired frame rate), to mitigate the effect that narrowing of the microlenses apertures has upon the total amount of light that reaches the sensor.

In the discussion that follows, a lenslet sub-image is a collection of pixels behind one lenslet. The 2D array of lenslet sub-images are indexed by using the coordinates [s, t], and a pixel within a lenslet sub-image via a set of local coordinates is referred to as [u, v]. Therefore, each pixel on the sensor can be uniquely identified via four coordinates [u, v, s, t]. Note that this coordinate system is commonly used to describe the discrete 4D light field l[u, v, s, t], where [s, t] are spatial coordinates, and [u, v] are angular coordinates. In the exposition below, a variety of parameters listed in Table 1 are utilized.

TABLE 1

Parameters in the LFM geometric optics model.

| Parameter | Definition |
|---|---|
| z | depth in the sample (relative to the active plane, with +z into the sample) |
| M | objective magnification |
| NA | objective numerical sperture |
| n | index of refraction of the sample & medium |
| $f_{\mu lens}$ | microlens focal length |
| $d_{\mu lens}$ | microlens pitch |
| $d_{pix}$ | effective sensor pixel size (taking magnification due to relay optics into account) |
| $\eta_{pix}$ | pixel fill factor |
| $\eta_{\mu lens}$ | microlens fill factor |
| $\xi$ | supersample factor | continuous vs. discrete volume coordinates: $v(x, y, z)$ vs. $u[n_x, n_y, n_z]$ continuous vs. discrete light field coordinates: $l(p_u, p_u, q_s, q_t)$ vs. $l[u, v, s, t]$ The model discussed below is implemented for imaging fluorescent sources with a center wavelength λ and a narrow spectral bandwidth (meaning that a point source has high temporal coherence). Fluorescence microscopy in this regard is an incoherent imaging process: although light from an ideal point source sums coherently to produce an interference pattern (i.e. the well-known Airy disk), the light from any two point sources in the volume will sum incoherently due to the rapid, random fluctuations in the emission time of different fluorophores. Hence, the optical model of the LFM is computed in two steps: first, the coherent image of an ideal point source is computed using methods from Fourier optics. This pattern is called the light field amplitude point spread function (lf-APSF), and if described with the function h(u, x) that gives the complex value of the wave field at pixel position $u \in \mathbb{R}^2$ on the sensor when an ideal point source is placed at position $x \in \mathbb{R}^3$ in the sample volume. The actual recorded intensity at pixel u is found by taking the squared modulus of the lf-APSF: $I=|h(u, x)|^2$. This is the light field intensity point spread function, or simply the lf-PSF. In contrast to normal fluorescence microscopy where the psf is translationally variant, and image formation can be modeled by a convolution integral, the lf-PSF h(u, x) is translationally variant, hence the light field image L(u) formed by imaging a volume with many fluorescent sources and must be computed by a superposition integral over lf-PSFs:

$$L(u) = \int |h(u,x)|^2 V(x) dx \quad (2)$$

Here, V(x) describes the radiance of each point in the volume. Assume that every point in the volume radiates light isotropically. For simplicity, the effects of scattering and changing the index of refraction in the volume may be ignored.

Figure 3:
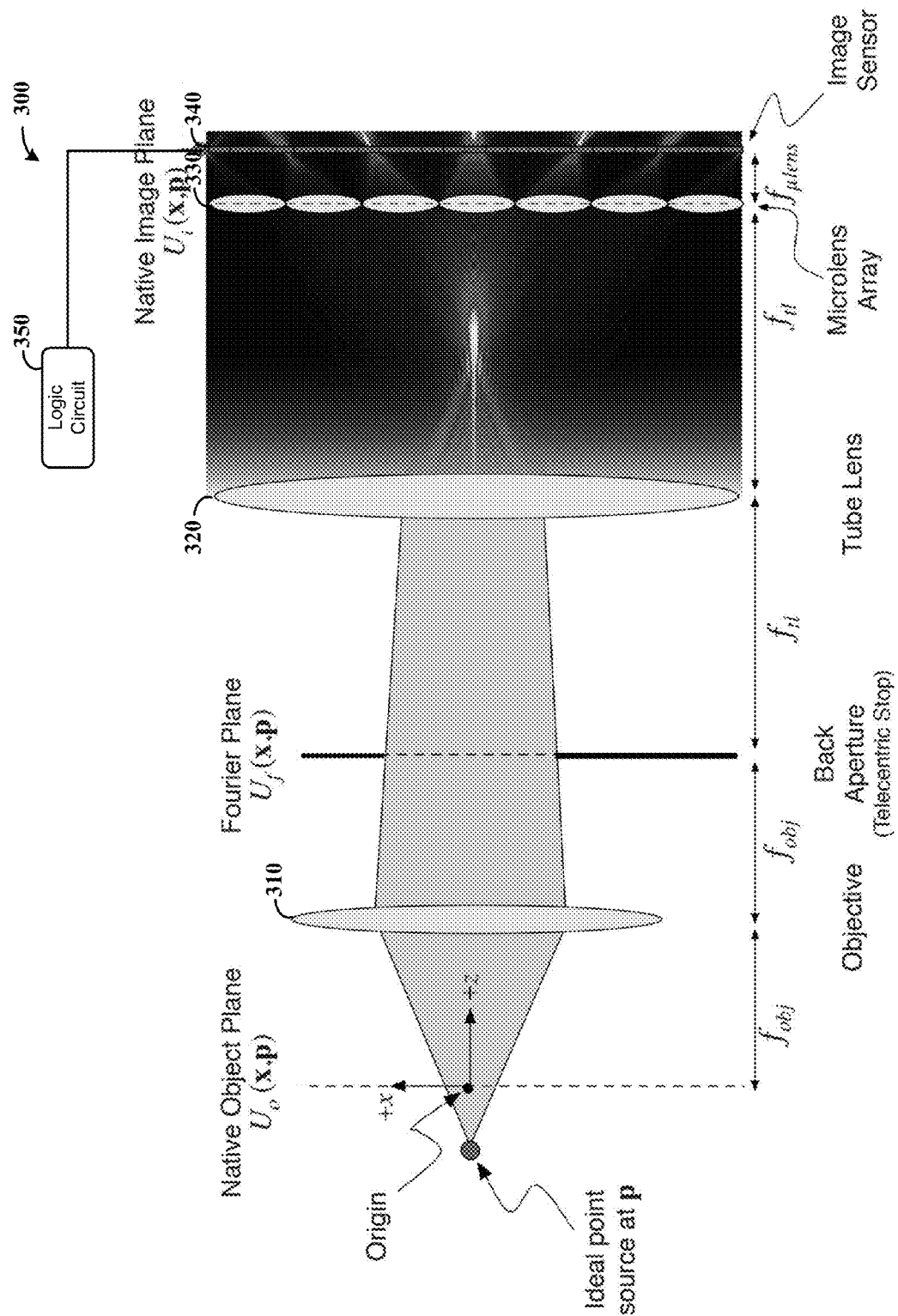
FIG. 3 shows an optical train of a light field microscope, in accordance with another embodiment.

FIG. 3 shows an optical train of the LFM 300 in a detailed embodiment. An objective lens 310 and tube lens 320 are in a 4-F optical configuration, in which the back aperture of the objective lens 310 serves as a telecentric stop, making the microscope both object-side and image-side telecentric. Light from the tube lens 320 is passed via a microlens array 330 to a photosensor 340. Logic circuit 350 is connected to photosensor 340 for processing data received therefrom, such as described above for reconstructing a deconvolved volume image. The focal length of the tube lens $f_{tl}$ is usually given by the microscope manufacturer ($f_{tl}$=200 mm here), and the focal length of the objective lens can be computed from the magnification factor: $f_{obj}=f_{tl}/M$. The focal length of a lenslet can be computed accurately from the radius of curvature $R_c$ and the index of refraction $n_{lenslet}$ of the lenslet substrate provided by the microlens array manufacturer. The following formula can be used to compute the focal length of a plano-convex lenslet array.

$$f_{\mu lens} = \frac{R_e}{n_{\mu lens} - 1} \quad (3)$$

An ideal point in object space at location $x_o$=(0, 0, 0) emits a spherical wavefront that is imaged by the objective lens 310 and tube lens 320, producing a wavefront at the image plane that is well-approximated by the 3D amplitude point spread function of a circular, thin lens, as may be consistent with the following, $$h(v, u) = \frac{M}{f_{obj}^2 \lambda^2} \int_0^1 P(\rho) \exp\left(-\frac{iu\rho^2}{2}\right) J_0(\rho v) 2\pi\rho \, d\rho \quad (4)$$

$J_0(\bullet)$ is the zeroth order Bessel function of the first kind, and v and u represent normalized radial and axial optical coordinates that can be computed as $$v \approx k\sqrt{x_1^2 + y_1^2} \sin\alpha$$

$$u \approx 4kz_1 \sin^2\frac{\alpha}{2}$$

where $\alpha=\sin^{-1}(NA/n)$ and the wave number $k=2\pi n/\lambda$ is computed using the emission wavelength λ, the NA of the objective, and the index of refraction n of the sample.

Normalized optical coordinates v and u are a notational convenience that allow us to express the 3D amplitude point spread function $h(x_1, y_1, z_1)$ in a general, unitless form. This 3D APSF at the image plane (prior to being imaged by the microlenses) is translationally invariant, and therefore it can be used to describe the APSF for an ideal point source at an arbitrary location $x_o$=($x_0, y_0, z_0$) via a simple change of coordinates, as may also be consistent with the following.

$$U_3(x_3, y_3) = \exp\left(-\frac{iu}{4\sin^2\left(\frac{\alpha}{2M}\right)}\right) h(x_0 + x_3/M, y_0 + y_3/M, z_o)$$

This squared modulus $|U_3(x_3, y_3)|^2$ gives the image intensity pattern that would be recorded at the image plane in a normal fluorescence microscope for an out of focus point source at $x_o$.

Each individual lenslet then retards the phase over a small area of the impinging wavefront.

$$\phi(x_3, y_3) = e^{-\frac{jk}{2f_{\mu lens}}(x_3^2+y_3^2)} \quad (5)$$

The phase mask is applied in a tiled fashion to the incoming wavefront, and the result is then propagated at a distance of $f_{lenslet}$ to the camera sensor. The lenslets in the LFM have a Fresnel number between 1 and 10, so the Fresnel propagator is an accurate and computationally attractive approach for modeling light propagation from the lenslets to the sensor. The final wavefront can be computed using the Fourier transform operator F {•}.

$$U_4(x_4,y_4) = \mathcal{F}^{-1}\{\mathcal{F}\{(U_3)(x_3,y_3)\phi(x_3,y_3)\}H(f_x,f_y)\} \quad (6)$$

where $H(f_x,f_y)=e^{th2}\exp\{-j\pi2(f_x^2+f_y^2)\}$ is the transfer function for a Fresnel diffraction integral.

Figure 14:
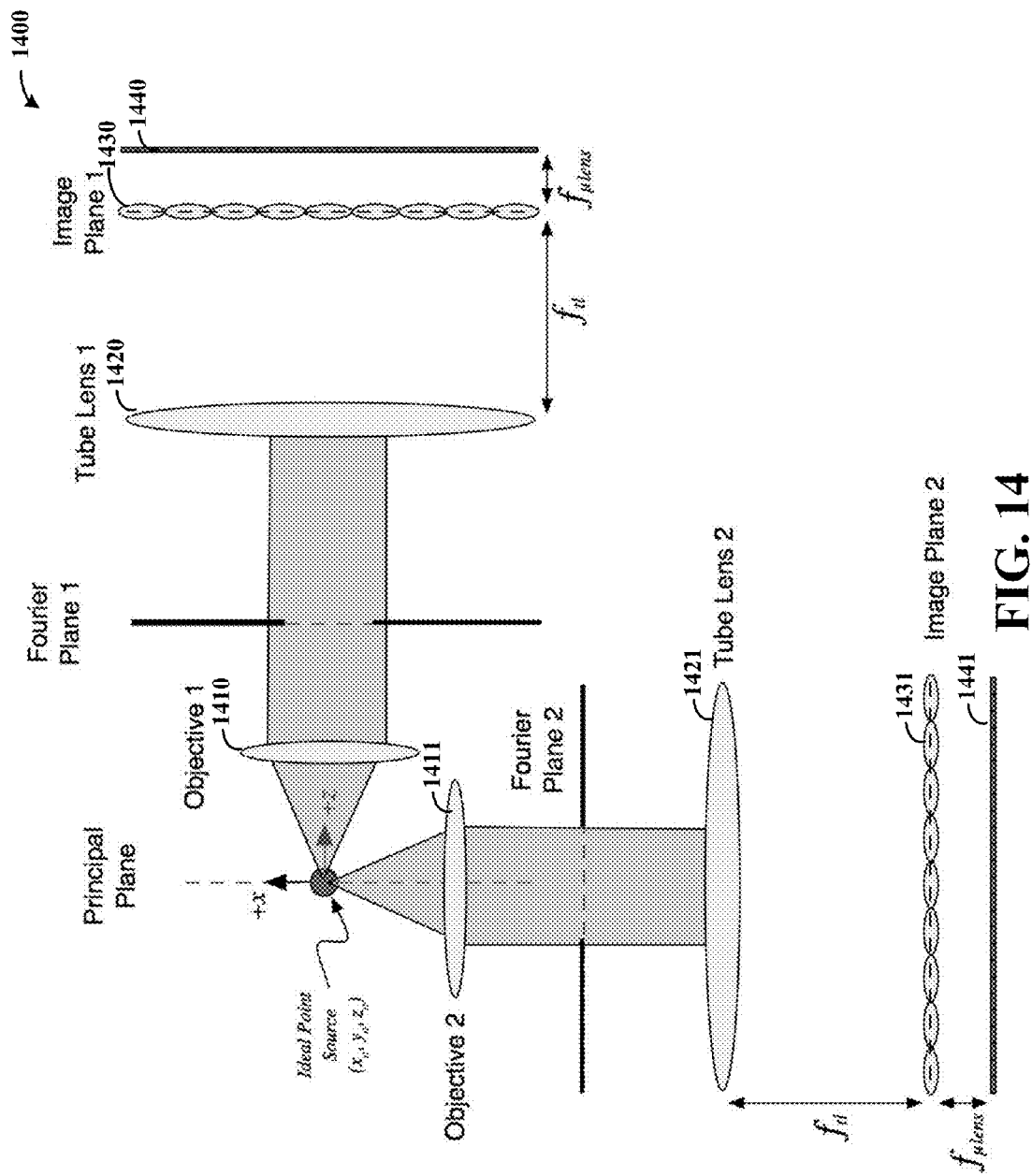
FIG. 14 shows another embodiment involving a light field microscope.

FIG. 14 shows another example embodiment involving a LFM 1400. In this embodiment, a 3-axis LFM is implemented to collect image data from a specimen using different photosensor/lens arrangements along each light path. Specifically, objective 1410, tube lens 1420, microlens array 1430 and photosensor 1440 are in a first light path, and objective 1411, tube lens 1421, microlens array 1431 and photosensor 1441 are in a second light path. Light detected at the respective photosensors can be combined and used as described herein. Such approaches can be implemented, for example, to achieve higher resolution, aliased image data at the principal plane of the 3D reconstruction, and improved axial resolution using additional viewing angles. In the 3-axis LFM embodiment, axial resolution equal to, or about equal to lateral resolution is achieved by collecting a full range of 3D viewing angles using orthogonal x, y and z optical paths. The x and y optical paths provide additional data to augment the data normally available in a single light path, to enhance resolution throughout 3D reconstruction, and can mitigate or eliminate aliasing at the principal plane. The light sensitivity of this configuration is also three times higher than a single lightpath approach because it collects photons that scatter at angles outside the NA of a single microscope objective. In the present embodiment, the frames of reference for the three optical paths can be co-registered by using a randomly distributed 3D constellation of diffraction limited fluorescent beads.

Figure 15:
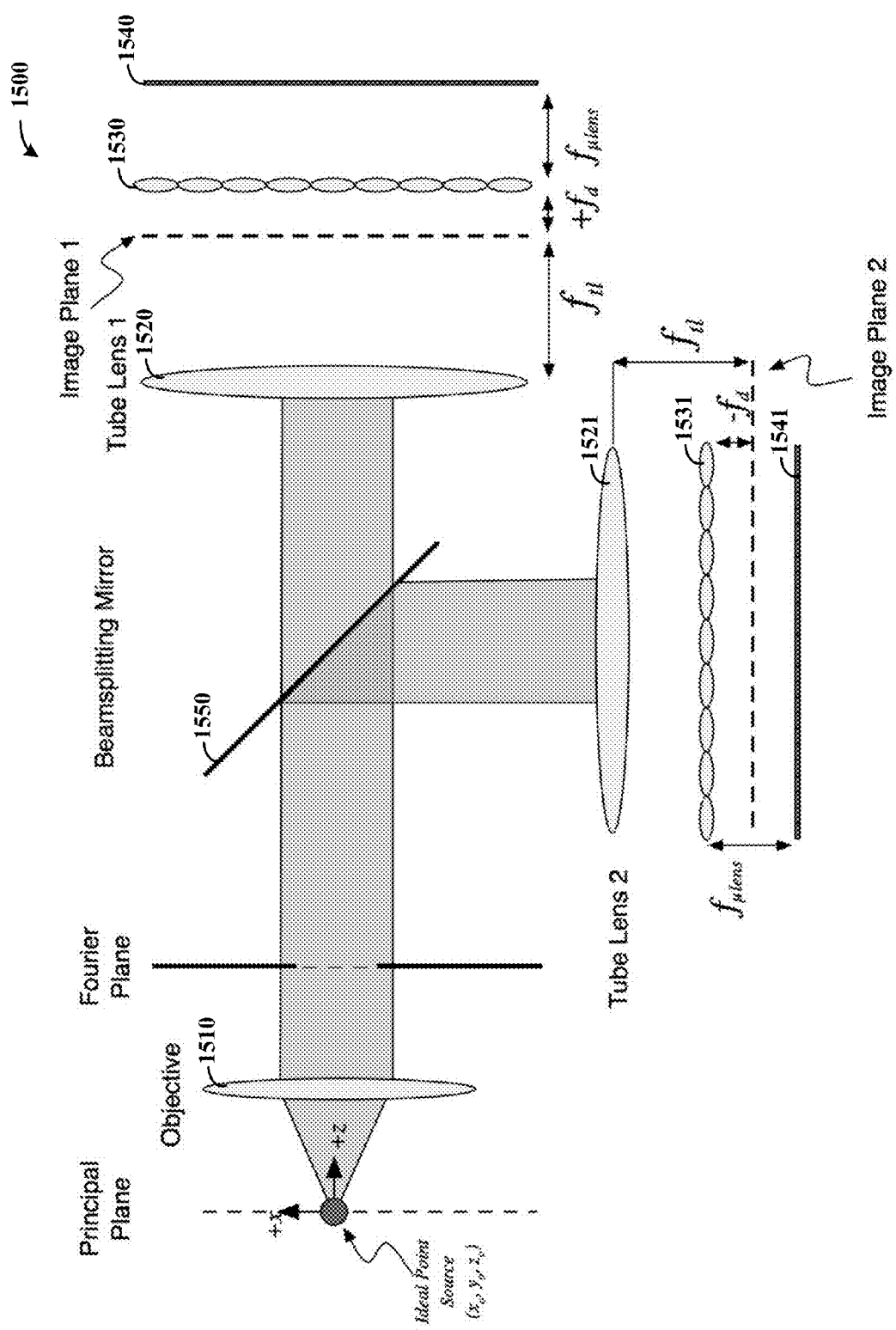
FIG. 15 shows another embodiment directed to a light field microscope.

FIG. 15 shows yet another embodiment directed to a LFM 1500. In this embodiment, a multifocal plane LFM 1500 has a beamsplitting mirror 1550 that creates two optical paths from an objective lens 1510, each including a tube lens 1520/1521, a microlens array 1530/1531 and an image sensor 1540/1541. Each microlens array and sensor is displaced by $+/-f_d$ relative to their nearby image planes in their respective optical paths. In this embodiment, both optical paths share the same microscope objective lens 1510, with light split between them using the beam splitting mirror 1550 in the space behind the microscope objective. This approach can be used to improve resolution and mitigate or eliminate aliasing at the native plane of the 3D reconstruction, by combining two complete light field observations that are made at different focal planes along the z-axis of the microscope. The lenslet plane of one optical path can be made to coincide with the plane of best resolution of the other optical path and vice versa, thereby achieving high resolution throughout the z-range. In the present embodiment, the frames of reference for the two optical paths can be co-registered by using a randomly distributed 3D constellation of diffraction limited fluorescent beads.

As described above an imaging model can be used to describe the intensity of light from fluorescent sample in a continuous volume at an image sensor behind a microlens array. In some embodiments, the light field tomography algorithm described herein attempts to solve the inverse problem, by using an observed light field to estimate the radiant intensity of light emitted at discrete voxels in the volume of finite size. In this approach, Equation 2 is discretized to form a forward, linear model of the imaging process.

Specifically, seeking to define a large, sparse system matrix A that describes how a discrete light field l is produced from a discrete volume v via the linear equation $$l = A \cdot v + \epsilon \quad (7)$$

where $\epsilon$ is IID Gaussian sensor noise. Here the light field is discretized, L(u) into $N_{rays}=N_u \times N_v \times N_s \times N_t$ discrete ray samples and rearranged them into a vector $l \in \mathbb{R}^{N_{rays}}$. These correspond to pixels on the image sensor; for an image sensor with P×Q pixels, $N_u$ and $N_v$ are equal to the number of ray angles recorded at each position in the light field (i.e. the number of pixels behind each lenslet), while $N_s=P/N_u$ and $N_t=Q/N_v$ are equal to the number of positions in the light field (i.e. the number of lenslets in the field of view).

Similarly, the continuous volume V(x) is sub-divided into $N_{voxels}=N_x \times N_y \times N_z$ voxels and re-arranged it into a vector $v \in \mathbb{R}^{N_{voxels}}$. The choice of sampling rate for the volume is tied to the question of how much high frequency information can be recovered when solving the inverse problem, and is tuned to suit particular applications involving sampling and resolution limits.

Consistent with one or more embodiments, the native resolution of the LFM is defined as the lenslet pitch divided by the objective magnification. This is the size of the conjugate image of a microlens if one were to de-magnify the lenslet it array and place it at the principal plane rather than the image plane. For example, for a 125 μm pitch microlens array and a 20× microscope objective, the native resolution would be 125/20=6.25 μm. A super-sampled reconstruction is a 3D volume or focal stack whose spatial sampling rate is an integer multiple of the native resolution. This multiple of the native resolution is called the super-sample factor $\xi \in \mathbb{Z}$. Reference to a volume super-sample factor of 4 over the native resolution as a "4× reconstruction" will be made. Continuing the example above (d=125 μm, M=20), a 4× reconstruction would have a resolution of 6.25 μm/4=1.56 μm. In general, the spatial sampling rate T of the volume is equal to d/(ξM).

The coefficients $a_{ij}$ of the system matrix A describe intensity of the light emitted from voxel i that arrives at pixel j on the image sensor. Note that voxels in the reconstructed volume and pixels on the sensor have finite volume and area, respectively. Therefore the coefficients of A are be computed via a definite integral of the lf-PSF, $$a_{ij} = \int_{\alpha_j}\int_{\beta_i} w_1(x)|h(u,x)|^2 dxdu \quad (8)$$

where $\alpha_j$ is the area for pixel j, and $\beta_i$ is the area for voxel i.

In accordance with various embodiments, an imaging model for a LFM is based on geometric optics. An equivalent (in a ray optics sense) optical path to the path depicted in FIG. 2B is created, where the objective and tube lens have been removed. A simplified model is shown in FIG. 4A, in accordance with an example embodiment. A de-magnified lenslet array is placed at the native plane of the microscope (i.e. conjugate to the image plane). The magnification is taken into account, so the pitch of these "equivalent" lenslets is equal to $d_{\mu lens}/M$. Behind the lenslets are de-magnified sensor pixels with pitch $d_{pix}/M$.

This drawing shows how the lf-PSF changes as the point source moves up and down in z. When the point source is very far from the native plane, the projection in each lenslet sub-images will be very nearly "in focus." As the point approaches the lenslet array, the lenslet images will become blurry as the point defocuses. When the point is at the native plane, the lenslets do nothing and the rays focus directly onto the sensor, albeit with limited NA since rays outside of the NA have been masked out by the back aperture stop of the microscope objective.

FIG. 4B shows a complementary view in accordance with one or more embodiments: a single point on the sensor surface collects light from a parallel bundle of rays in the sample volume. Sensor pixels have a finite width, so the actual bundle of rays recorded over the square area of a sensor pixel spreads out gradually with increasing distance from the native plane, as shown in FIG. 4C, in accordance with one or more embodiments.

The bundle of rays collected by a single sensor pixel is referred to as a ray spread. If one superimposes all expanding ray spreads that intersect the point source, it becomes evident that the 3D point spread function of the LFM is the sum of a finite number of discrete, overlapping ray bundles. FIG. 4D illustrates the 3D lf-PSF in accordance with one or more embodiments, in which the 3D PSF of the LFM is both position and depth-dependent.

Figure 4E:
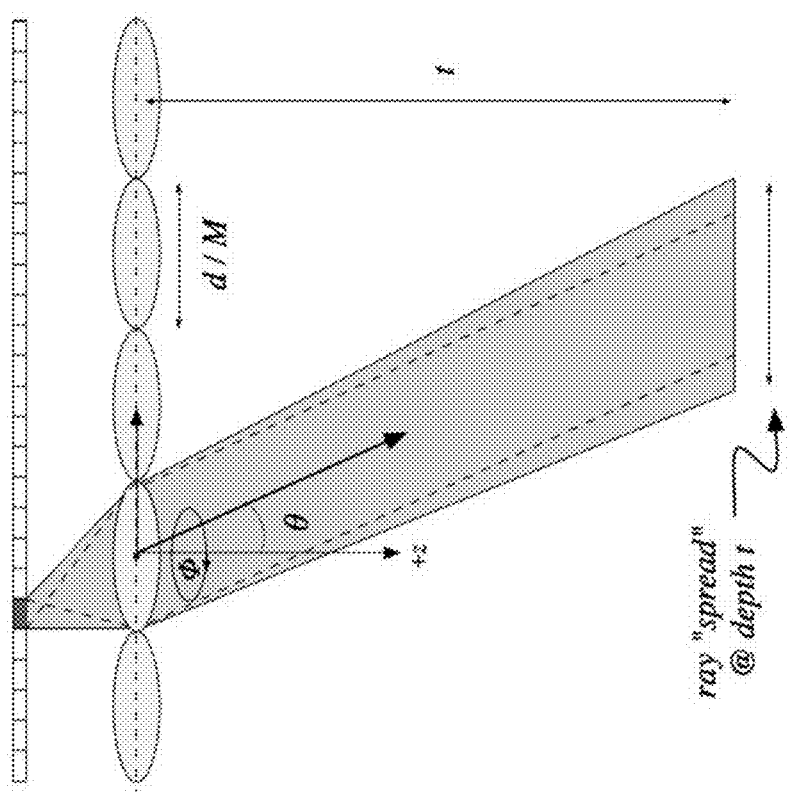
FIG. 4E shows another microlens array and photosensor array, as may be implemented in accordance with one or more example embodiments.
Figures 4A, 4B:
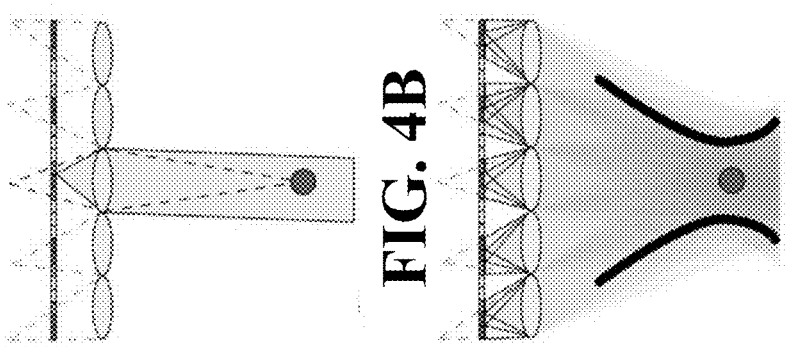
FIG. 4A shows microlens and photosensor arrays, as may be implemented in accordance with one or more example embodiments.
FIG. 4B shows another microlens array and photosensor array, as may be implemented in accordance with one or more example embodiments.
Figures 4C, 4D:
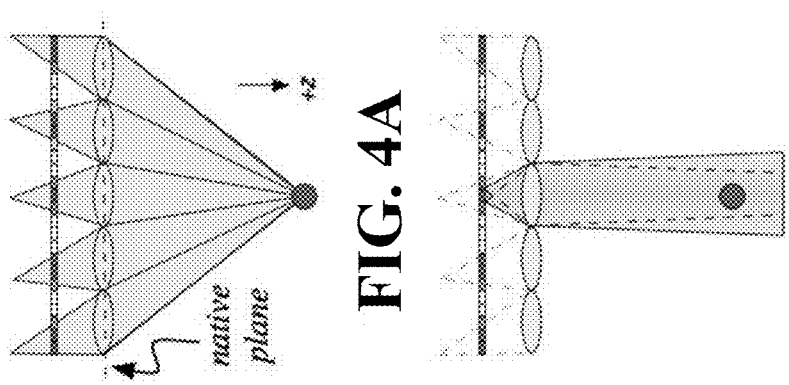
FIG. 4C shows another microlens array and photosensor array, as may be implemented in accordance with one or more example embodiments.
FIG. 4D shows another microlens array and photosensor array, as may be implemented in accordance with one or more example embodiments.

Having established their utility in our optical model, FIG. 4E shows an embodiment in which the position and direction of each ray spread in the volume is computed as a function of the continuous light field pixel coordinates $(p_u, p_v, q_s, q_t)$. One can see from FIG. 4E that $\theta(p_u, p_v)$ is the declination angle of a principal ray passing through any point $(p_u, p_v)$ a distance r from the center of a microlens sub-image containing $N_u \times N_v$ pixels. For flat-field (i.e. "plan") corrected objectives, this angle is given by the Abbe sine condition.

$$r_{NA} = N_u/2 = N_v/2 \quad (9)$$

$$r = \sqrt{(p_u - (N_u - 1)/2)^2 + (p_v - (N_v - 1)/2)^2}$$

$$\Theta(p_u, p_v) = \sin^{-1}\left(\frac{r}{r_{NA}} \cdot \frac{NA_{\mu lens}}{n}\right)$$

$$\Phi(p_u, p_v) = \tan^{-1}\left(\frac{p_v - r_{NA}}{p_u - r_{NA}}\right)$$

The angle $\Phi(u, v)$ is a rotation of the principal ray around the optical axis of the lenslet after the deflection has been taken into account. The NA of the lenslet can be computed from lenslet's pitch & its focal length given in Equation 3. To stay within the present disclosure's simplified optical model, convert from the lenslet's image side NA behind the microscope objective to an object side NA by multiplying by the magnification factor.

$$NA_{\mu lens} = M \tan^{-1}\left(\frac{d_{\mu lens}}{2 f_{\mu lens}}\right) \quad (10)$$

Using the angles $\theta(p_u, p_v)$ and $\Phi(p_u, p_v)$, we can form a ray intersection operator $g(\cdot)$ that allows us to compute the horizontal sample coordinates where a ray $(p_u, p_v, q_s, q_t)$ will intersect plane z in the sample volume.

$$g(p_u, p_v, q_s, q_t, z) = \begin{pmatrix} \frac{q_s d}{M\xi} + z \cdot \tan^{-1}[\Theta(p_u, p_z)]\cos[\Phi(p_u, p_v)] \\ \frac{w_t d}{M\xi} + z \cdot \tan^{-1}[\Theta(p_u, p_v)]\sin[\Phi(p_u, p_v)] \\ z \\ \Theta(p_u, p_v) \\ \Phi(p_u, p_v) \end{pmatrix} \quad (11)$$

This intersection function can be useful for projecting rays from the 4D light field into 3D volume arises. In the following discussion, $g(\cdot)$ is used when integrating the rays in the sample volume that sum together to produce a complete ray spread.

The Radon transform, which is a decomposition of a volume in terms of line integrals, is employed in one or more embodiments involving computed tomography, to describe projections of the volume being imaged. Looking at Equation 13, each point in the geometric approximation to the light field being summed is over a line through the volume (appropriately weighted for radiometry). The Radon transform of a function $f: \mathbb{R}_+^2 \to \mathbb{R}_+$ the line integral $$R_{p,q}f(x,z) = \int_L v(x,z)dl$$

$$l(p,q) = \iint v(x,z)\delta(x \cos \theta(p) + z \sin \theta(p) - q)dxdz,$$

$$l(p,q) = \iiint v(x,y,z)\delta(x \cos \theta(p)\sin \Phi(p) + x \cos \theta(p)\cos \Phi(p) + z \sin \theta(p) - q)dxdydz (3D)$$

where $\delta(\cdot)$ is the Dirac delta function. Considering the 2D light field parameterized by coordinates $(p, q) = (p_u, q_s)$, and the corresponding slice through a volume parameterized by coordinates $(x, z)$, the continuous light field description given by Equation 13 for the 2D case can be rewritten as $$l(p,q) = R_{p,q}v(x,z) = \iint v(x,z)\delta(x \cos \theta(p) + z \sin \theta(p) - q) dxdz.$$

Further, if also summed over the size of a pixel $\Delta p$, the discretized light field described by Equation 15 can be rewritten as $$l[u,v,s,t] = \int_{\Delta p} \int_{\Delta q} R_{p,q} v(x,y,z) dp dq.$$

This can be generalized to a limited angle imposed by NA by constraining $\theta(p)$, and related to sinogram representation (plot in p and q). This relationship can be implemented for tying current results to classical tomographic reconstruction which relies heavily on the Radon transform, showing that each pixel in the discrete (sampled) light field is integrating over a bundle of rays constituting a fraction of the continuous Radon transform for the objective, and relating to Wigner rotations and FRFT.

In various embodiments, light from a continuous, fluorescent volume is averaged together & discretized in a single light field "snapshot" made by the camera. It is assumed that each point in the continuous sample volume radiates light with total intensity equal to $V(x)$ where $x = (x, y, z)$ are continuous 3D coordinates. When imaging a fluorescent volume, two assumptions are made: (1) all points in the volume radiate light iostropically; and (2) light travels in straight lines without any scattering. The first assumption holds when discretizing the volume, using discrete voxels that are large enough to contain many randomly oriented fluorescent molecules that average out to an isotropic radiation pattern. The second assumption, while convenient for formulating a concise optical model, may be more approximate. Various aspects are directed to eliminating the need for this assumption.

Note that some ray angles are masked out by the limited NA of the microscope objective. Specifically, any ray emanating from the sample volume at declination angles greater than $$\theta_{NA} = \pm \sin^{-1}\left(\frac{NA_{objective}}{n}\right)$$

are either severely aberrated or not captured at all by the microscope. It is assumed, for various implementations, that ray angle masking is independent of position in the volume. This is holds true since most microscope objective/tube lens systems are very nearly telecentric, meaning that the range of ray angles that pass through the telecentric stop is the same for all positions on the sample plane. Based on these assumptions, a function is formulated to describe how much light radiates at a given position and direction in the volume.

$$r(x, y, z, \Theta, \Phi) = \lim_{r \to \infty} \begin{cases} \frac{v(x, y, z)}{4\pi r^2} & -\theta_{na} \le \Theta \le \theta_{na}, 0 \le \Phi \le 2\cdot\pi \\ 0 & \text{otherwise} \end{cases} \quad (12)$$

Figures 5A, 5B:
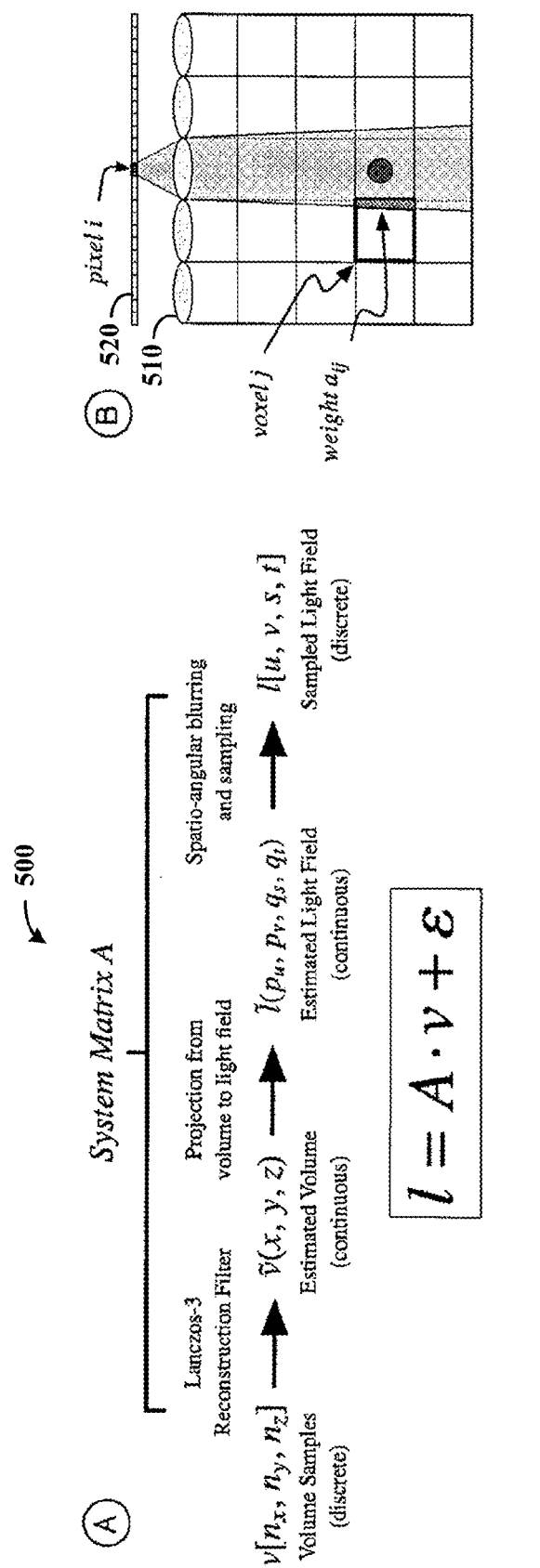
FIG. 5A shows a system matrix, in accordance with another example embodiment.
FIG. 5B shows a microlens array and photosensor, consistent with another example embodiment.

Here, r is the radius of the volume being considered. In some implementations, the constant factor of $1/4\pi r^2$ is varied depending on the size of our discrete voxels, but for a continuous volume, the limit can be taken as $r \to \infty$. This radiometry function is closely related to a 4D light field function: the light field sums contributions from rays originating across all z-planes that are travelling in the same direction $(\theta, \Phi)$ through the point $(x, y)$ on the native plane. The change of coordinates computed by the ray intersection operator $g(\cdot)$ in Equation 11 provides an expression of the 4D light field function as an integral involving a change of coordinates to Equation 12, as also relevant to FIG. 5A showing a system matrix 500, and FIG. 5B showing a microlens array 510 and photosensor 520:

$$l(p_u, p_v, q_s, q_t) = \int_{-\infty}^{\infty} r(g(p_u, p_v, q_s, q_v, z)) dz \quad (13)$$

The continuous light field is discretized by averaging over ray positions and angles that are captured by a single discrete light field pixel [u, v, s, t]. In this set of integrals consideration is made for the finite size and fill factor of the lenslet array and sensor pixels, and also takes into account the radiometry and shape of the microlens apertures via a lenslet radiometry function:

$$\alpha(q_s, q_t, s, t) = \quad (14)$$

$$\begin{cases} h(M/d \cdot (q_s - s), M/d \cdot (q_t - t)) & s \le q_s \le s+1 \text{ and} \\ & t \le q_t \le t+1 \\ 0 & \text{otherwise} \end{cases}.$$

For a square-packed microlens array with truncated spherical lenslets, the microlens shape function $h(\cdot)$ is 2D rect($\cdot$) function. For non-truncated spherical lenslets, the microlens shape is best described by a 2D circ($\cdot$) function.

Combining this together, what remains is an equation integrating over space and angles, describing the light collected by a single light field pixel.

$$l[u,v,s,t] = \iiiint \alpha(q_s,q_t,s,t) l(p_u,p_v,q_s,q_t) dp_u dp_v dq_s dq_t \quad (15)$$

In various embodiments, a light field tomography algorithm attempts to solve the inverse problem of an imaging model as above (describing how light from the continuous volume under a microscope is recorded by discrete light field pixels), by estimating a volume from the discrete light field observation. This volume estimate can be discretized, such as by modifying the model above to produce a discrete, linear forward model of the light field capture. Specifically, a large, sparse system matrix A is implemented to describe how a discrete light field l is produced from a discrete volume estimate v via the linear equation l=A·v+ϵ where ϵ is IID Gaussian sensor noise. This model involves (1) choosing a sampling rate, and (2) choosing an appropriate reconstruction (i.e. anti-aliasing) filter for the volume. An example optimal sampling rate is discussed below with resolution limits, and the reconstruction filter is described in detail here.

In accordance with one or more embodiments of the present disclosure, the native resolution of the LFM is defined as the size of a de-magnified lenslet in an optical model as described above. For example, for a 125 μm pitch microlens array and a 20× microscope objective, the native resolution would be 125/20=6.25 μm. A super-resolved reconstruction is a reconstructed volume or focal stack whose spatial sampling rate is an integer multiple of the native resolution. This multiple of the native resolution is called the supersample factor $\xi \in \mathbb{Z}$. A superresolved volume with a supersample factor of 4 may be referred to as a "4× reconstruction." Continuing the example above (d=125 μm, M=20), a 4× reconstruction would have a resolution of 6.25 μm/4=1.56 μm. In general, the spatial sampling rate T of the volume is equal to d/(ξM). Given these definitions, the discrete sampling of a continuous volume is written as $$v[n_x,n_y,n_z] = v(n_x T, n_y T, n_z T) \quad (16)$$

A discrete volume $v[n_x, n_y, n_z]$ is implemented using a reconstruction filter with appropriate anti-aliasing properties to construct an estimate of the continuous volume $\tilde{v}(x,y,z)$. Convolving the discrete volume with a Lanczos-3 windowed sinc( ) function produces a continuous volume where aliasing is minimized.

$$\mathcal{L}(x, y, z) = \text{sinc}\left(\frac{\pi}{T}\sqrt{x^2+y^2+z^2}\right) \cdot \text{sinc}\left(\frac{\pi}{3T}\sqrt{x^2+y^2+z^2}\right) \quad (17)$$

$$\tilde{v}(x, y, z) = v[n_x, n_y, n_z] * \mathcal{L}(n_x T, n_y T, n_z T) \quad (18)$$

This reconstructed, continuous volume estimate is used in Equation 12 to produce an estimated radiometry function:

$$\tilde{r}(x, y, z, \Theta, \Phi) = \begin{cases} \frac{\tilde{v}(x, y, z)}{4\pi T^2} & -\theta_{na} \le \Theta \le \theta_{na}, 0 \le \Phi \le 2\cdot\pi \\ 0 & \text{otherwise} \end{cases} \quad (19)$$

The estimated radiometry can be substituted directly into Equations 13 and 15 to compute the (approximate) contribution of a single voxel in the discrete volume to a light field pixel [u, v, s, t]. FIG. 5A shows these steps from a discrete volume representation to a discrete light field representation. All of the steps in between may be carried out in continuous coordinates as described herein, except with the reconstructed volume estimate $\tilde{v}(x,y,z)$ used in place of the real volume v(x, y, z).

Finally, a forward linear model suitable for solving is formulated using inverse problem solving techniques. Discretize the volume to be reconstructed so that it has $N_{voxels}=N_x \times N_y \times N_z$ voxels. From this volume a light field b is formed that has $N_{rays}=N_u \times N_v \times N_s \times N_t$ discrete ray samples. The discrete voxels $v[n_x, n_y, n_z]$ are arranged into a vector $v \in \mathbb{R}^{N_{voxels}}$, and the discrete light field pixels are arranged into a vector $l \in \mathbb{R}^{N_{rays}}$. The contribution made by voxel j to light field pixel i is computed by setting all voxels equal to zero except for $v_j$ equal to 1, and then computing the contribution to each pixel via the model described above. Performing this computation for all pixels yields a sparse collection of weight $a_{ij}$ that can be used to populate the entries of a system matrix A, as shown in FIG. 5A. The system matrix, in essence, captures the computation carried out in continuous coordinates including the Lanczos-3 windowed reconstruction filter, projection from 3D volume to 4D light field, and spatio-angular blurring and sampling at the image sensor. Or equivalently, the system matrix encodes the position and depth dependent point spread function of the LFM. The end result is a simple linear model $l = A \cdot v + \epsilon$. Solving this linear system for the volume v performs 3D deconvolution of the lf-PSF.

Looking at Equation 13, for each point in the geometric approximation to the light field, a summing is made over a line through the volume (appropriately weighted for radiometry). Recall that the Radon transform of a function $f: \mathbb{R}_+^2 \to \mathbb{R}_+$ is the line integral $$R_{p,q}f(x,z) = \int_L f(x,z)d\ell$$
$$= \int\int f(x,z)\delta(x\cos\Theta(p)+z\sin\Theta(p)-q)dxdz,$$

where $g(\cdot)$ is the Dirac delta function. Considering the 2D light field parameterized by coordinates $(p, q)=(p_u, q_s)$, and the corresponding slice through a volume parameterized by coordinates $(x, z)$, the continuous light field description given by Equation 13 for the 2D case can be rewritten as $$R_{p,q}v(x,z) = \int\int v(x,z)\delta(x\cos\theta(p)+z\sin\theta(p)-q)dxdz.$$

Further, if summing over the size of a pixel $\Delta p$, the discretized light field described by Equation 15 can be rewritten as $$R_{\Delta p, \Delta q}v(x,z) = \int_{\Delta p}\int_{\Delta q}\int v(x,z)\delta(x\cos\theta(p)+z\sin\theta(p)-q)dxdz.$$

As also consistent with the above examples, this can be generalized to a limited angle imposed by NA by constraining $\theta(p)$, and related to sinogram representation (plot in p and q). This relationship can also be informative for tying current results to classical tomographic reconstruction which relies heavily on the Radon transform, showing that each pixel in the discrete (sampled) light field is integrating over a bundle of rays constituting a fraction of the continuous Radon transform for the objective, and relating to Wigner rotations and FRFT.

Volume reconstruction is carried out in a variety of manners, and in some embodiments as a convex optimization problem. In one embodiment, the volume x is discretized to be reconstructed so that it has $N_{voxels}=N_x \times N_y \times N_z$ voxels. From this volume, a light field l is formed and that has $N_{rays}=N_u \times N_v \times N_s \times N_t$ discrete ray samples via the following linear imaging model: $l = Av + \epsilon$. A is the so-called system matrix that encodes the forward projection of a 3D volume to a 4D light field. Its entries are the ray spread weights. A is an extremely large (millions by millions), sparse matrix containing $N_{voxels}$ columns by $N_{rays}$ rows, though its entries are relatively straight-forward to compute using the optical model presented. The $\epsilon$ term is a random variable modeling IID Gaussian sensor noise including read noise, dark current, and photon shot noise (photon shot noise follows a Poisson distribution, but this is well-approximated by a Gaussian for counts in excess of roughly 100 photons). The $\epsilon$ term is assumed to be vector-valued with zero mean and a variance-covariance matrix $\Sigma$.

The maximum a posteriori (MAP) estimation problem for estimating v from observed data l in terms of maximizing the likelihood is written as $$\hat{v} = \operatorname*{argmax}_v Pr(l|A,v)Pr(v),$$

or in terms of the log likelihood as $$\hat{v} = \operatorname*{argmax}_v Pr(l|A,v) + \log Pr(v).$$

Assuming a uniform prior for $Pr(v)$ and IID Gaussian noise with diagonal sample covariance matrix $\Sigma$, then the distribution is $$Pr(l|A,v) \sim \mathcal{N}(Av, \Sigma) \propto \exp[(l-Av)^T \Sigma^{-1}(l-Av)].$$

and obtaining the following least squares optimization problem for estimating the volume from the observed light field data:

$$\operatorname*{minimize}_v \|Av - l\|_{\hat{\Sigma}}^2,$$

where $\hat{\Sigma}$ is a sample estimate of the noise covariance $\Sigma$. Various implementations solve the above problem using tomographic applications relying upon an iterative reconstruction method that provably converges to the least squares solution, such as a SIRT, in which:
$\hat{\Sigma}$ assumed to be diagonal,
the kth SIRT iteration can be written $$v^{(k+1)} \leftarrow v^{(k)} + A \cdot \hat{\Sigma}^{-1}(l - Av^{(k)})$$

where $$\hat{\Sigma}_{ii}^{-1} = \frac{1}{\operatorname{var}(v_i)}.$$

and the convergence depends on spectrum of A (maximum eigenvalue), which can be used to choose a relaxation parameter to speed convergence.

One or more embodiments of the present disclosure are directed to addressing challenges such as those relating to: speckle, no use of prior information, sensitivity to correlations, and differences in rate of convergence for different volumes which result in differences in amount of regularization. Differences in amount of regularization makes comparing volumes difficult, as for a fixed number of iterations or a fixed convergence criterion, two volumes may experience a different amount of regularization.

If the maximum likelihood formulation is implemented as non-degenerate, and using some prior information, an optimization problem for estimating a volume from light field data is:

$$\underset{v}{\text{minimize}} \ \|Av - l\|_{\Sigma}^2 + \lambda J(v), \quad (20)$$

where $J(\cdot)$ is a shrinkage or penalty function that penalizes deviation of estimates from the prior distribution.

In other domains that solve large inverse problems in millions of variables, generalizations of Landweber iteration or proximal methods can be employed to solve such problems and may take the form:

$$v^{(k+1)} \leftarrow \eta_k(v^{(k)} + A^* r^{(k)})$$

$$r^{(k)} \leftarrow l - Av^{(k)},$$

where k is the iteration counter and $\eta_k$ is a scalar thresholding (or other projection function) that effectively denoises or shrinks the update. Such approaches, like SIRT, generally have low per-iteration cost and low storage requirements, and therefore scale to very large problems (much larger than standard convex solvers can handle).

Various embodiments employ approaches derived from the theory of belief propagation in graphical models, and which add an additional term to the iterations above to yield:

$$v^{(k+1)} \leftarrow \eta_k(v^{(k)} + A^* r^{(k)})$$

$$r^{(k)} \leftarrow l - Av^{(k)} + (1/\delta) r^{(t-1)}(\eta^*_{k-1}(v^{(k+1)} + A^* r^{(k-1)})),$$

in which $\eta_k$ can take a variety of forms.

A TV approach can be implemented in this regard to yield desirable reconstruction in a variety of tomographic and more general inverse problems on image data. Various embodiments derive AMP-TV for this application, and attain desirable minimax reconstruction error. Such a TV problem can be written $$\underset{v}{\text{minimize}} \ (1/2)\|Av - l\|_{\Sigma}^2$$

$$\text{subject to} \ \sum_{i=1}^{n^J} \|F_i v\|_p \le c, \ j = 1, \ldots, J,$$

where following the notation of [Wang et al, 2008], $F_i v \in \mathbb{R}^J$ is the discrete gradient of the volume v at pixel i in J dimensions, and where $F_j \in \mathbb{R}^{n^* \times n^*}$, j=1, . . . , J are the first order finite difference matrices with appropriate boundary conditions.

Various embodiments involve one or more resolution limits and tradeoffs with regard to the same involving a LFM as described herein. Four main performance parameters of the microscope are implemented in this regard, including maximal achievable lateral resolution at any given z-plane in object space, maximal achievable axial resolution along the z-axis, the Field Of View (FOV) captured by the microscope and the axial range over which the LFM can provide sufficient resolving power. An analysis in the object-space spatial coordinate system is performed, using de-magnified microlenses and sensor pixels.

The maximal achievable lateral resolution of the LFM in terms of the highest object-space spatial frequency is defined, measured in line-pairs per mm (and denoted lp/mm), for which the combined frequency response of the LFM is above a certain threshold (which can be determined as described herein), and which can be analyzed in Fourier domain. Using an optical Model as shown in one or more of FIGS. 2A-2D, the combined frequency response of the LFM (e.g., its Modulus Transfer Function (MTF)), is affected by the microscope objective (together with the matching tube lens), the microlenses array and the camera sensor pixels. All these components apply optical low-pass filtering, which degrades the maximal achievable lateral resolution. The LFM's MTF is a multiplicative combination of each of these components' frequency responses.

The dominant component that limits the lateral resolution of the LFM is the microlens array. As described above, each pixel under a microlens collects light from a bundle of rays that spreads through the sample volume. The width of each such bundle of rays is determined by the size of the aperture of a microlens and by the effective sensor pixel size in the particular z depth. Assuming ideal microlenses, the circular aperture of the microlenses can be modeled as the circ function $$a(r) = \text{circ}\left(\frac{2Mr}{d_{\mu lens}\eta_{\mu lens}}\right),$$

where $r = \sqrt{x^2 + y^2}$ and its Fourier transform (normalized to give 1 at 0 spatial frequency) is given by $$A(\rho) = 2M \frac{J_1(\pi d_{\mu lens}\eta_{\mu lens}\rho/M)}{\pi d_{\mu lens}\eta_{\mu lens}\rho},$$

where $\rho = \sqrt{w_x^2 + w_y^2}$ is the spatial frequency in polar coordinates. The sensor pixels are assumed to be square, therefore a de-magnified pixel can be modeled as a two-dimensional rect function $$b(x, y) = \text{rect}\left(\frac{2Mx}{\eta_{pix}d_{pix}}\right)\text{rect}\left(\frac{2My}{\eta_{pix}d_{pix}}\right).$$

The finite physical size of a sensor pixel results in a spreading of the each ray bundle along the axial axis of the LFM (e.g., as in FIG. 4A-4E), which degrades the lateral resolution at z-planes farther away from native plane.

Figure 6:
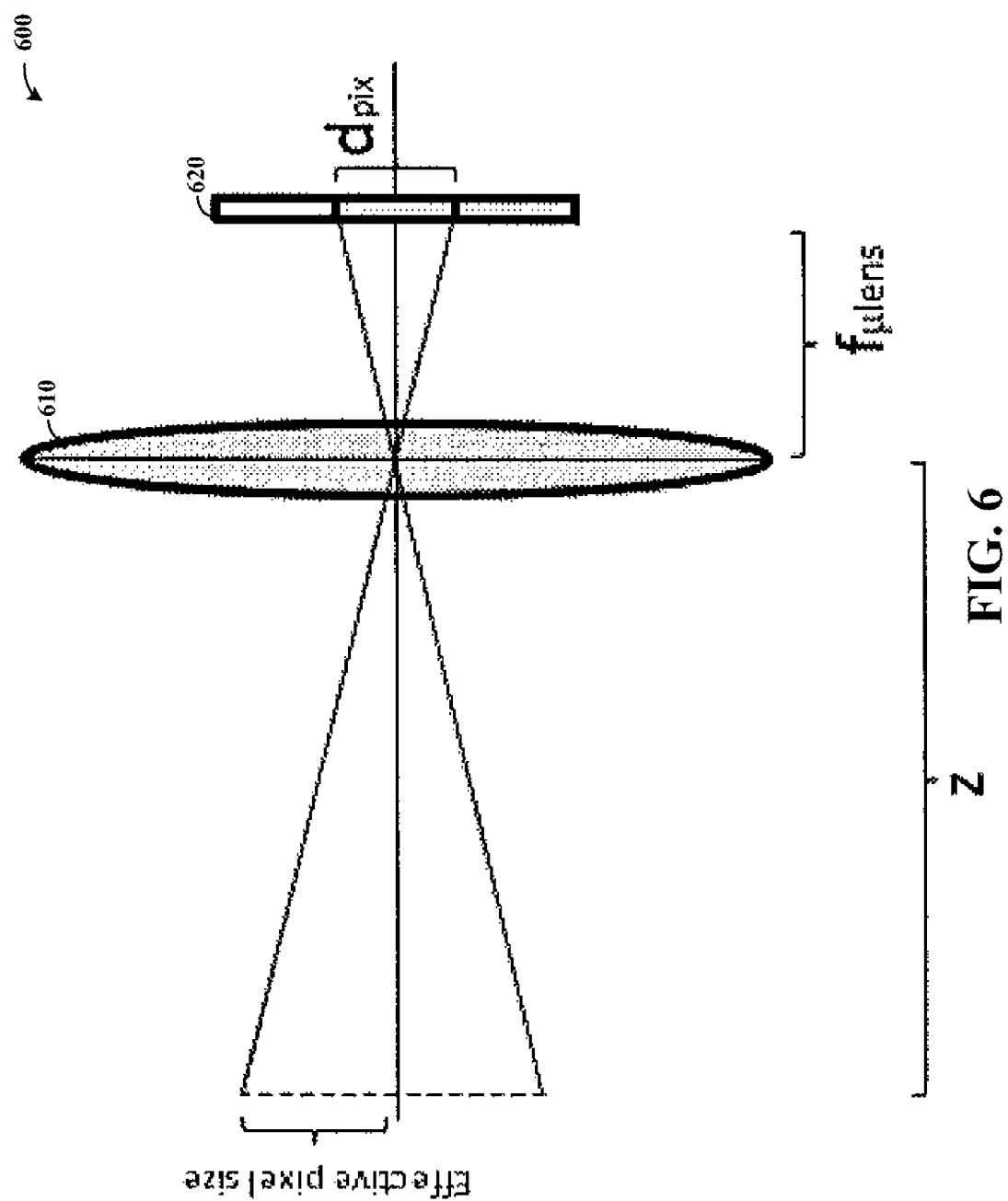
FIG. 6 shows an approach for analyzing resolution, in which an effective pixel size over which light is integrated at a given z depth, in accordance with another example embodiment.

For analyzing the resolution, an effective pixel size over which light is integrated at a given z depth is implemented as shown in arrangement 600 in FIG. 6, with lens 610 and sensor 620 operating with effective pixel size as shown. From a similar triangles argument, it follows that the effective pixel size has a de-magnified width of $$\bar{d}_{pix} = \frac{d_{pix}z}{f_{\mu lens}}$$

The impact of the effective pixel size on the system's MTF is therefore a sinc function, with a width that depends on the distance z of the imaged object point from the native plane along the axial axis, and is given by $$B(\omega_z, \omega_y) = \left(\frac{\eta_{pix} d_{pix} z}{2M f_{\mu lens}}\right)^2 \text{sinc}\left(\frac{\eta_{pix} d_{pix} z \omega_x}{2M f_{\mu lens}}\right) \text{sinc}\left(\frac{\eta_{pix} d_{pix} z \omega_y}{2M f_{\mu lens}}\right).$$

It is evident that the farther away a plane is from the native plane along the axial axis, the more severe is the degradation in lateral resolution, and the rate at which this degradation occurs as a function of z depends strongly on the objective magnification. The area over which a pixel with a physical size of $d_{pix}$ integrates light depends on the distance of the light source from the native plane. The farther away an object is from the native plane, the larger the effective pixel size is. This results in degraded spatial resolution away from the native plane.

Two additional factors that further limit the lateral resolution are diffraction effects from the microscope objective and from each microlens. Assuming the objective suffers from very low aberrations, its circular aperture gives rise to a diffraction Point Spread Function (PSF) which is given by $$e(r) = \left(\frac{2J_1(\pi r/\lambda NA)}{\pi r/\lambda NA}\right)^2.$$

Its diffraction-limited MTF is given by $$C(\rho) = \frac{2}{\pi}\left(\cos^{-1}\left(\frac{\rho}{\rho_c}\right) - \frac{\rho}{\rho_c}\sqrt{1 - \left(\frac{\rho}{\rho_c}\right)^2}\right).$$

where $\rho_c$ is the cutoff spatial frequency, defined by $$\rho_c = \left(\frac{\lambda}{2NA}\right)^{-1}.$$

Ideally, the microlenses f-number is chosen such that it matches the objective's working f-number $N_w$, so that their image of the objective's back aperture efficiently fills the sensor without overlapping or leaving unused space between them, and so that there is no additional penalty on the resolution limit of the microscope. In such a case, the (de-magnified) microlenses will have the same diffraction spot as the objective's. Therefore, when analyzing the resolution, the microlenses' response $A(\rho)$ is multiplied by the objective's response $C(\rho)$ to get the combined microlenses frequency response $\overline{A}(\rho) = A(\rho) C(\rho)$. If the microlens f-number does not match the objective's $N_w$—for example, if a low fill-factor array is used—then the microlens diffraction spot should be calculated by plugging in a microlens f-number instead of the $$\frac{1}{2NA}$$

term in $e(r)$ and $C(\rho)$.

Figure 7A:
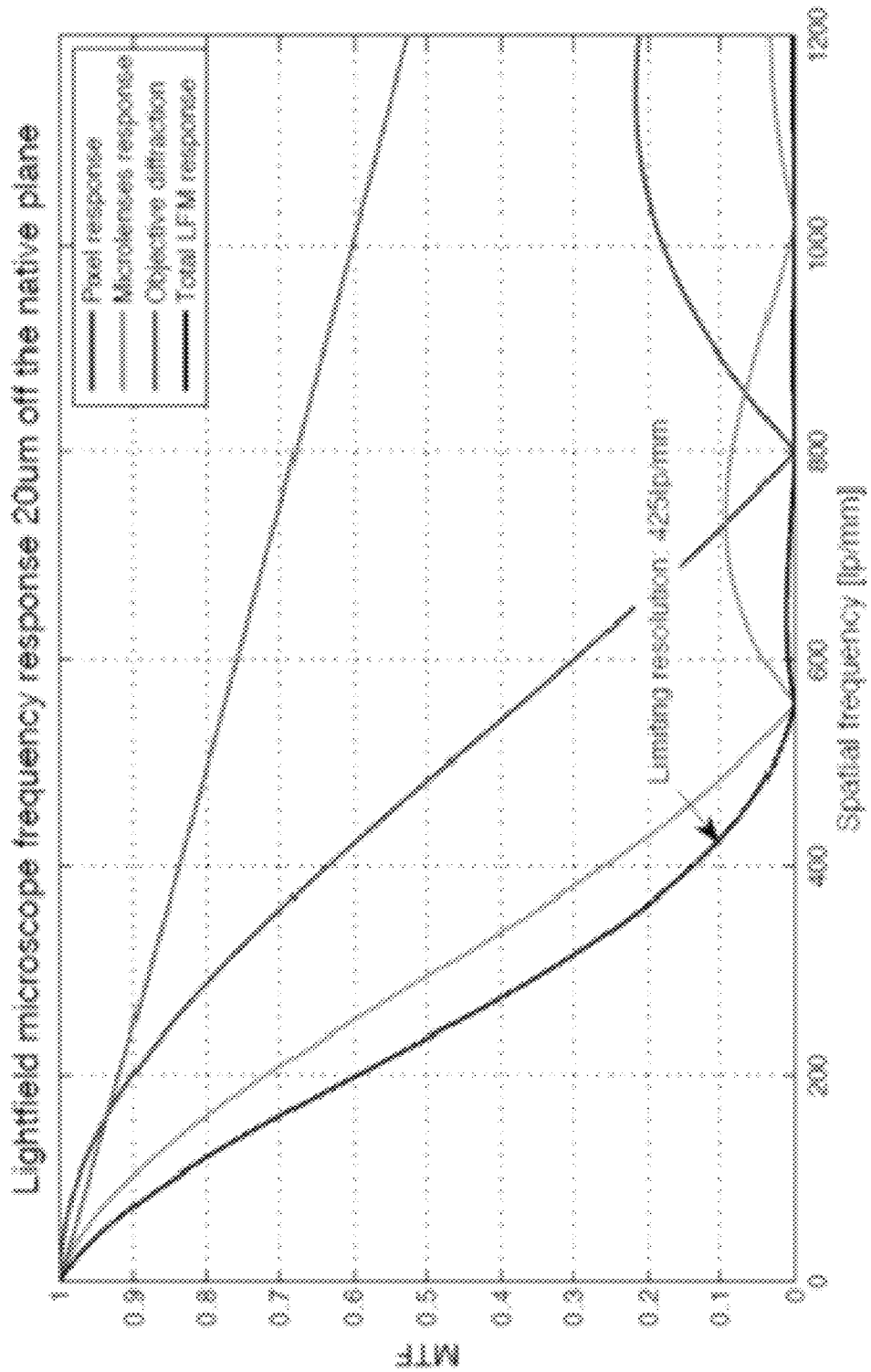
FIG. 7A illustrates a cross-section of 2-dimensional MTF functions, in accordance with one or more embodiments.
Figure 7B:
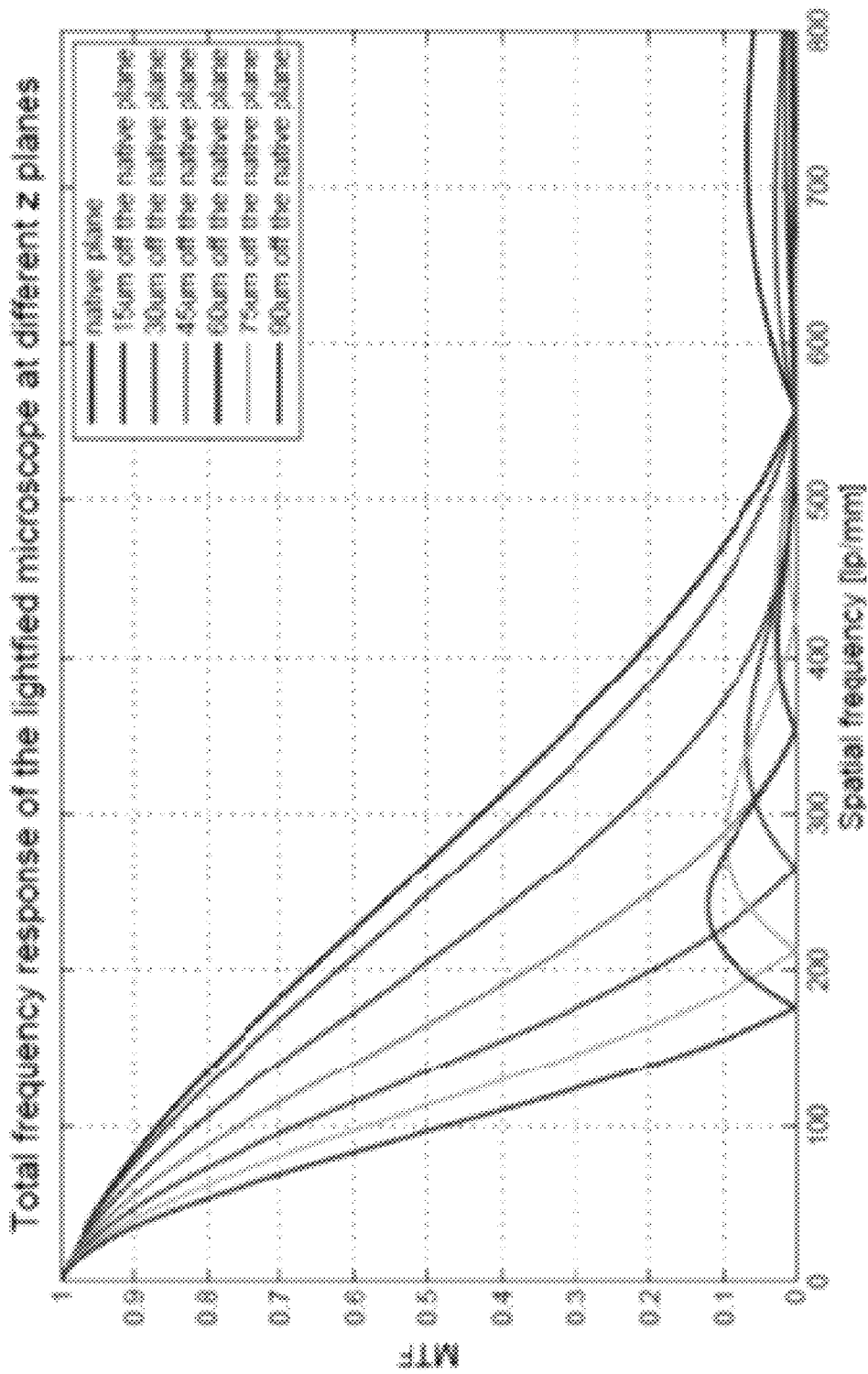
FIG. 7B shows the degradation of resolution due to the effective pixel size for several z depths, in accordance with one or more embodiments.
Figure 7C:
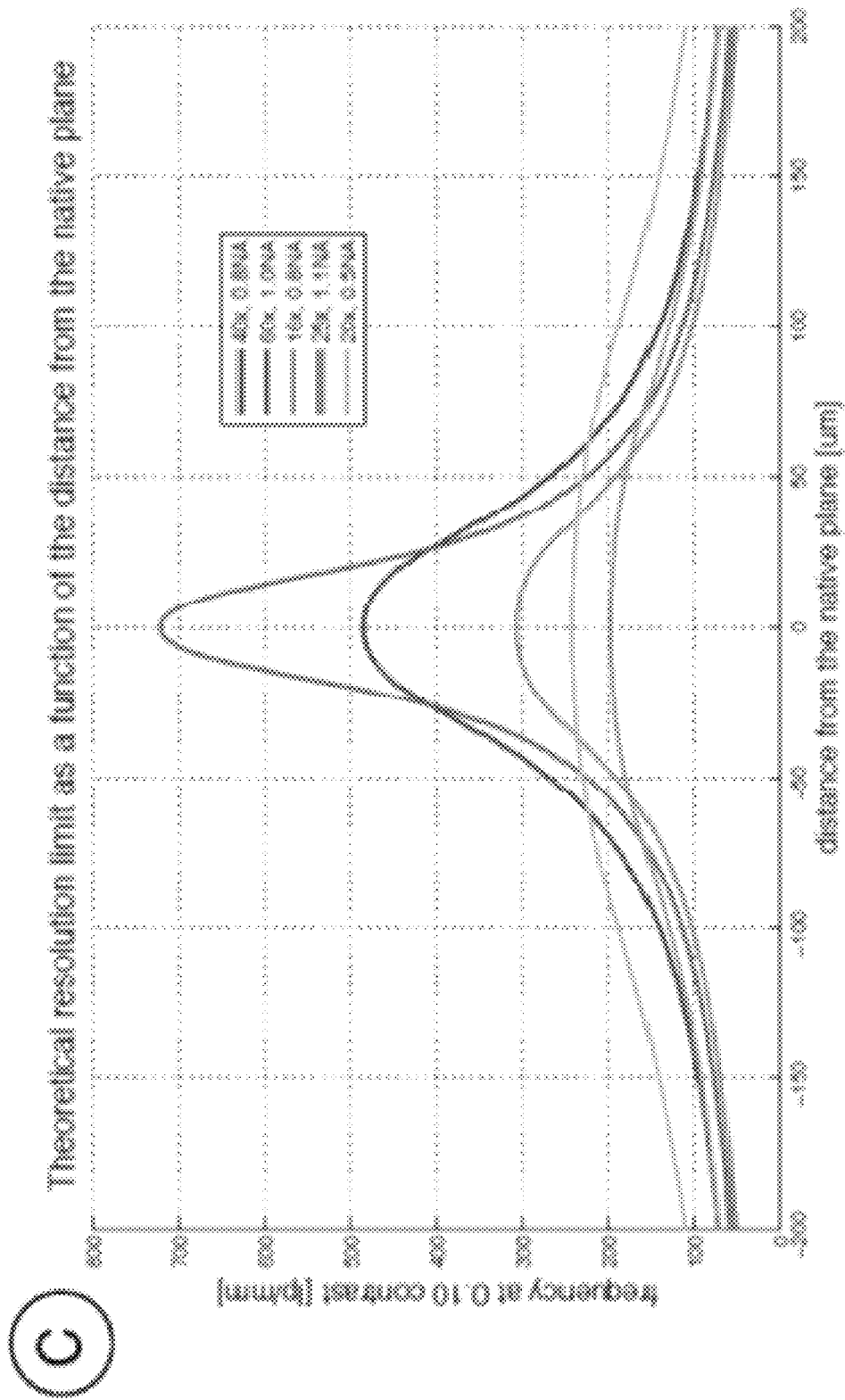
FIG. 7C shows a maximal achievable resolution limit of the LFM with different objectives, in accordance with one or more embodiments.

The threshold value which is used to determine the limiting spatial frequency is set according the Signal to Noise Ratio (SNR) in the imaged volumes—when imaging in high SNR conditions, the threshold can be set to very low values (e.g., 1-2%). In some implementations, a contrast threshold of 10% can be used to match the SNR in the type of samples imaged FIG. 7A illustrates a cross-section of the 2-dimensional MTF functions of each of the microscope components for a particular configuration, as well as the resulting system MTF. FIG. 7B shows the degradation of resolution due to the effective pixel size for several z depths, and FIG. 7C shows a maximal achievable resolution limit of the LFM with different objectives, as a function of the object's distance from the native plane.

The other three performance parameters are defined as follows—the maximal achievable axial resolution of the LFM is similar to that of a standard microscope and given by the Abbe resolution limit $$\frac{2\lambda}{NA^2}.$$

This translates to a maximal spatial frequency of $$\frac{NA^2}{4\lambda}[lp/\text{mm}].$$

The FOV of the microscope in the horizontal axis is given simply by $$FOV = \frac{N_{pix} d_{pix}}{M},$$

where $N_{pix}$ is the number of sensor pixels in the horizontal direction. Lastly, the axial range over which the LFM can provide sufficient resolving power as the range of distances from the native plane over which the lateral resolution remains above the native resolution of the microscope is defined. For example, using a 40×0.8NA objective and a 125 um-pitch microlenses array results in a native resolution of $$40\frac{1}{(2 \cdot 125E^{-3})} = 160[lp/\text{mm}],$$

the axial range of this LFM constitutes all the object distances for which the LFM is able to resolve higher spatial frequencies than 160 [lp/mm]. From FIG. 7C, this is a range of ±87 um around the native plane.

In addition to traditional tradeoffs such as the choice of objective magnification which strikes a balance between FOV and lateral resolution and between z-range and axial resolution—there are tradeoffs unique to the LFM, such as determining the size of a microlens that trades off axial range with lateral resolution. FIG. 7A shows the frequency response of each of the microscope's components and the overall system MTF for an object 20 um off the native plane. The configuration: 40×0.8NA objective, 125 um, 70% fill-factor microlenses and 24 pixels under each microlens. In this case, the resolution limit for a 10% contrast threshold is 425 [lp/mm]. FIG. 7B is the total frequency response of the LFM at different z-planes. The effective pixel size results in degraded resolution away from the native plane. The configuration is the same as in FIG. 7A. FIG. 7C depicts the limiting lateral spatial resolution of the LFM for across z depths for different objectives. The configuration is the same as in FIGS. 7A and 7B.

FIG. 8A shows a spider chart comparing the four performance parameters of three objectives, showing a clear tradeoff between lateral resolution, field of view and z range, in accordance with one or more embodiments. FIGS. 8B-8E compare the performance parameters across different objective magnifications with varying the NA, the microlens pitch and the number of pixels under each microlens, in accordance with one or more embodiments.

One or more factors may make experimentally achieved resolution lower than the theoretical limits derived herein. For example, the limited number of sufficiently different subimages around a native plane makes super-resolution gains small or impossible and microlens manufacturing limitations may result in unmodeled optical aberrations. Other details such as the alignment of the optics and accuracy of the calibration, such as discussed in the underlying provisional application, the density of light sources and scattering coefficients of the medium and sample may further degrade the resolution. Accordingly, various experimental and other-type embodiments are implemented as follows, in which the lateral resolution of a microscope under ideal imaging conditions—low noise, no scattering objects or medium, and light confined to a single plane only—is measured by imaging a USAF resolution target. Then, a pinhole is imaged to characterize the axial resolution, and volumetric fluorescence imaging is demonstrated at video frame rates over an entire 20× objective FOV of 830 μm by 560 μm by 300 μm by imaging a biological sample that's transparent, fluorescent and moves on a timescale of seconds.

To experimentally characterize the lateral resolution of the LFM, Köhler illumination is used and a USAF 1951 Negative resolution target (Max Levy DA052) is imaged at four different z-depths (one image per microscope configuration per z-depth). This procedure is done both without a microlens array (a fluorescence microscope configuration) and with a microlens array (LFM) on a Nikon Eclipse 80i microscope with 20×0.5NA water dipping objective. The light field images are either processed into focal stacks or deconvolved volumes, from which the appropriate z-plane of interest is extracted, while no processing was necessary for the microscope images.

Figure 9A:
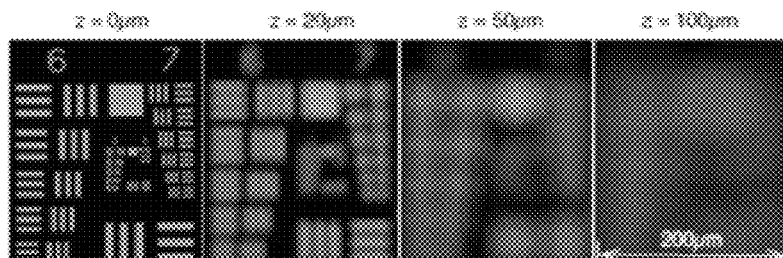
Figure 9B:
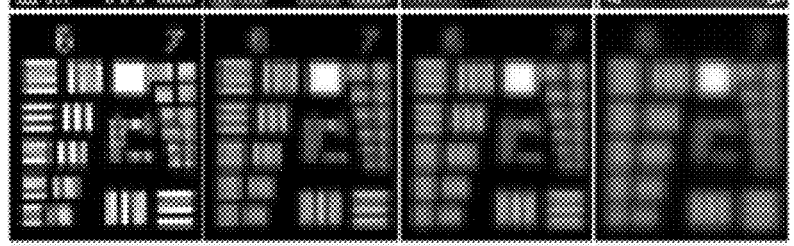
Figure 9C:
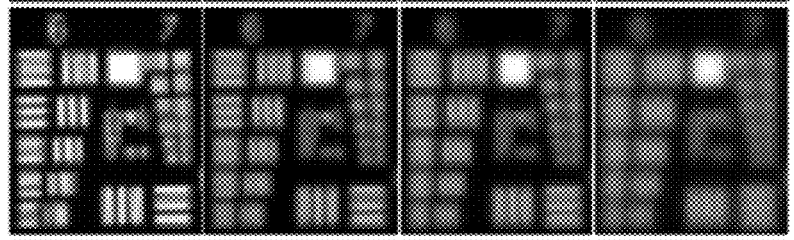
Figure 9D:
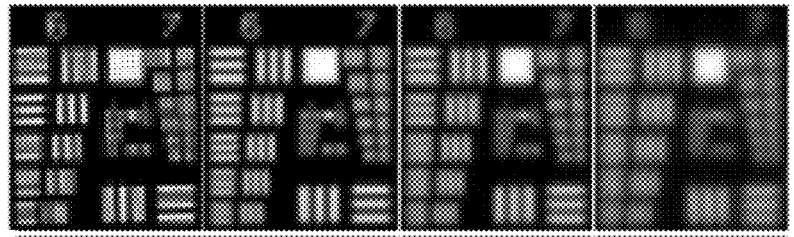
Figure 9E:
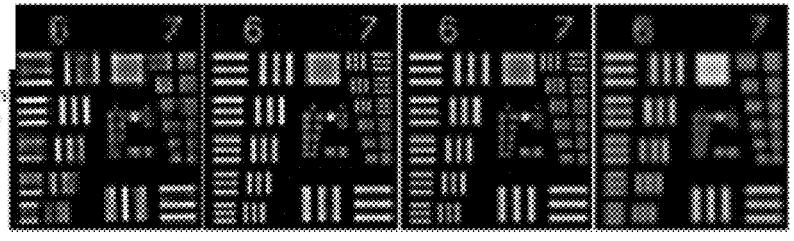

FIGS. 9A-9E compare the lateral resolution performance using a USAF 1951 target with 20×0.5NA water dipping objective. FIG. 9A depicts a fluorescence microscope (first row) which achieves its best resolution at the native plane (first column), but significant defocus blur occurs at depths above and below the native plane (other columns). FIG. 9B is an LFM (second row) used for computational refocusing at different z-depths but at a significant loss in spatial resolution, with a native resolution of 6.3 μm. FIG. 9C shows results from using the presently disclosed super-resolution deconvolution method (third row), in which much of that lost resolution is recovered and the resolution ranges between 2.2 μm and 4.2 μm resolution across a z-depth of 200 μm. FIG. 9D shows refocusing 4×, and FIG. 9E shows 4× super-resolution deconvolved images.

Next, a more extensive characterization of the lateral resolution as a function of z-depth for different microscope objectives is done and the results agree well with the theoretical model above. Here, the same USAF target was imaged at different z-depths and processed into deconvolved volumes, from which the z-plane containing the USAF target was extracted for contrast analysis. For each z-depth, a measurement of visibility at the various USAF resolution increments is obtained, and for a given visibility threshold, we can determine a corresponding maximum resolvable resolution (in lp/mm) for each z-depth.

FIG. 10 plots these experimentally characterized resolution limits, along with the resolution predicted by our theoretical model. The figure demonstrates general agreement between the experimentally measured lateral resolution and the resolution as predicted by the model. Note that at or near the native plane (within one de-magnified lenslet focal length), the reconstructed images contain artifacts related to insufficient spatial sampling of the light field which makes the problem ill-posed, and the computed visibility metric (omitted in the figure) is no longer valid. In some implementations, the highest resolution is achieved between 10 μm to 30 μm from the native plane, and slowly decreases from there.

FIGS. 10A-10D depict experimentally characterized lateral resolution as a function of z-depth. FIG. 10A shows the native resolution (dotted flat line), surpassed by the current super-resolution limited-angle tomography algorithm (dotted curved line). A theoretical model as described herein and based on microlens array and sensor pixel parameters yields an upper bound (solid line) on the resolution. FIG. 10B shows a 1951 USAF resolution target reconstructed from light field micrographs taken at various z-depths as indicated by the arrows illustrate how (i) no super-resolution is possible at the native plane due to a lack of spatial oversampling, (ii) the resolution peaks a few tens of microns away where the higher effective sampling rate makes super-resolution possible, and (iii-iv) the resolution falls away due to the blurring induced by the expanding width of each ray spread. In FIGS. 10C-10D, the same analysis holds true for other microscope objective lens and microlens array configurations, and as such it is possible to use this theoretical model to explore various LFM design trade-offs.

Figure 11:
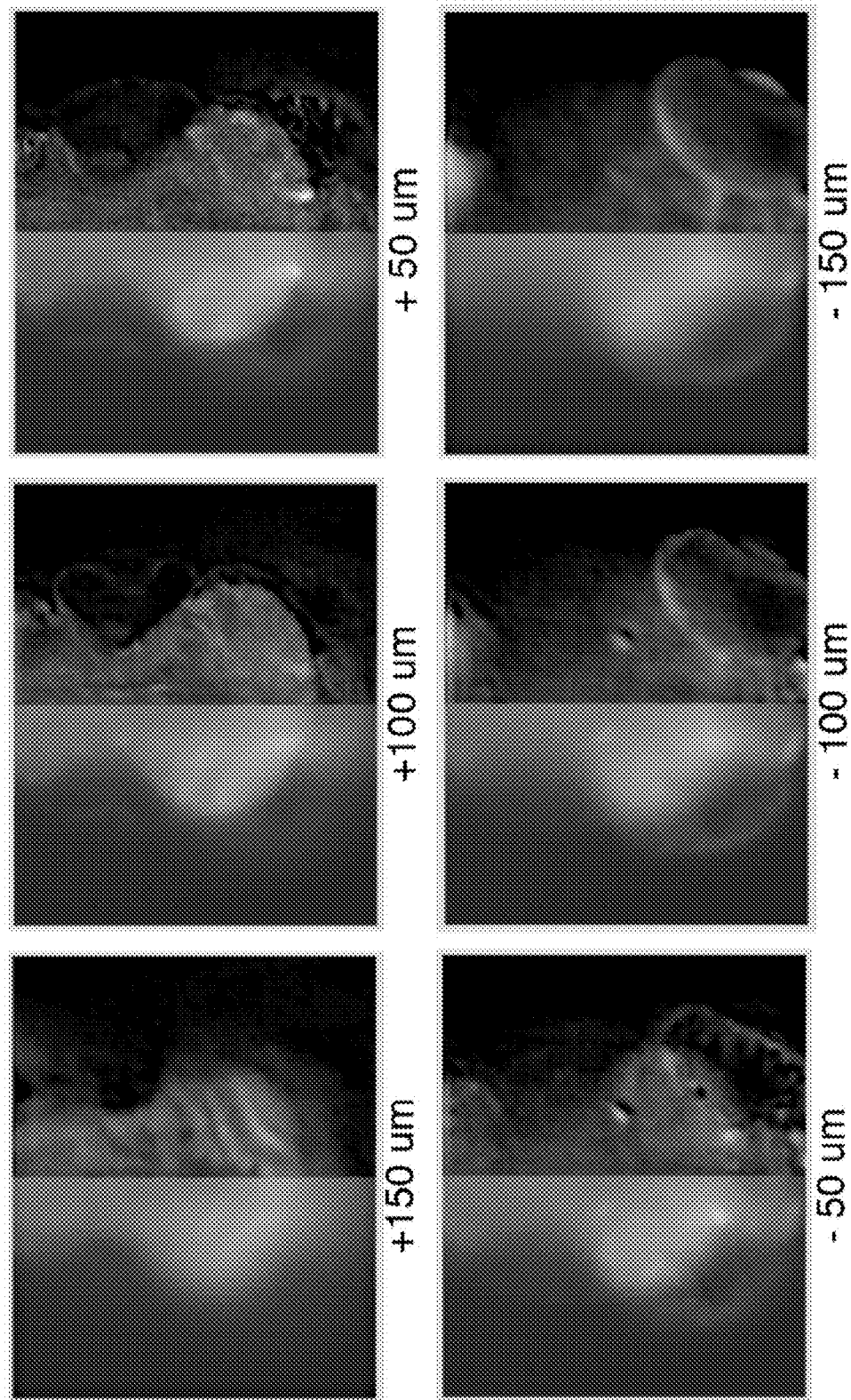
FIG. 11 depicts the use of one or more embodiments of the present disclosure for transparent, fluorescent specimen.
Figure 12:
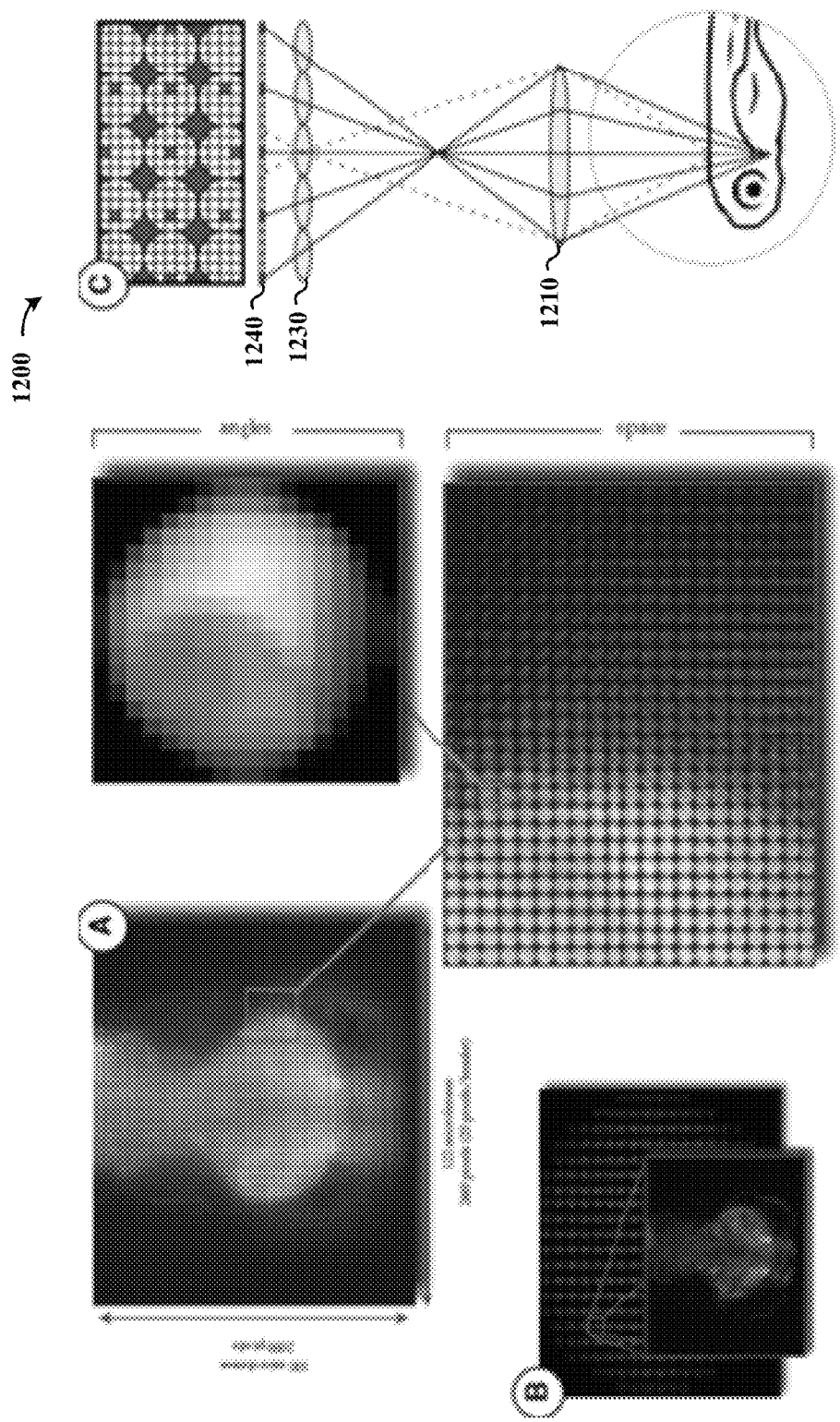
FIG. 12 depicts the use of one or more embodiments of the present disclosure for transparent, fluorescent specimen.

FIGS. 11 and 12 depict the use of one or more embodiments of the present disclosure for transparent, fluorescent specimen. With specific regard to FIG. 12, apparatus 1200 may be implemented in accordance with embodiments herein, with objective 1210, microlens array 1230, and photosensor array 1240.

For information regarding details of other embodiments, experiments and applications that can be combined in varying degrees with the teachings herein, reference may be made to the experimental teachings and underlying references provided in the following appendices of the underlying provisional application, which are fully incorporated herein by reference. Embodiments discussed in these appendices are not intended, in any way, to be limiting to the overall technical disclosure, or to any part of the claimed invention unless specifically noted. These documents are identified as Appendices A, B, C and D, and are entitled as follows:
A. "Diffraction Limited Light Field Tomography."
B. "Diffraction Limited Imaging & Computed Tomography with the Light Field Microscope—Technical Addendum #1"
C. "Diffraction Limited Imaging & Computed Tomography with the Light Field Microscope—Technical Addendum #2"
D. "Diffraction Limited Imaging & Computed Tomography with the Light Field Microscope Manuscript"

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., light sampling, combining light rays). For example, in certain of the above-discussed embodiments, one or more modules are discrete logic circuits or programmable logic circuits configured and arranged for implementing these operations/activities, as FIG. 5A, a processor type circuit with the microscope in FIG. 2A and/or as may be connected to sensors 216, 226 or 236, or to the various other sensors shown in other figures (e.g., logic circuit 350). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., non-volatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, various imaging approaches and related approximations as described herein may be implemented together or separate. Many different types of optical arrangements, including those shown by way of example in the figures, may be implemented with the approaches described herein. For instance, embodiments involving a tube lens may omit the tube lens, or add other lenses. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
objective lens;
a microlens array; and
a photosensor array including respective sets of photosensors configured and arranged to
detect light rays received at different angles from a specimen via the objective lens and microlens array, the light rays detected by each set of photosensors representing an aliased view of the specimen, and
provide an output indicative of aliased views of the specimen; and
a logic circuit configured and arranged with the photosensor array to reconstruct a deconvolved volume image of the specimen, including information indicative of at least one of position and depth in the specimen, by combining the aliased views detected by the sets of photosensors based upon overlapping light rays from the different angles in the volume, the logic circuit being configured and arranged to reconstruct the deconvolved volume image by using the light rays and an irregular overlapping pattern of the light rays to increase an effective spatial sampling rate of the light rays relative to an actual sampling rate at which the photosensor detects the light rays.

2. The apparatus of claim 1, wherein the logic circuit is configured and arranged with the photosensor array to compute deconvolved volume images by, for each image, combining data indicative of ones of the detected light rays that correspond to aliased views of the specimen, based upon respective angles at which the ones of the detected light rays are received.

3. The apparatus of claim 1, wherein the logic circuit is configured and arranged with the photosensor array to compute a deconvolved volume image of the specimen using data indicative of the detected light rays including at least one of optical aberrations, diffraction, and aliasing produced by at least one of the objective lens, microlens array, and photosensor array.

4. The apparatus of claim 1, wherein the logic circuit is configured and arranged with the photosensor array to compute a deconvolved volume image of the specimen using data indicative of at least one of angular and spatial characteristics of the detected light rays.

5. The apparatus of claim 1, wherein the photosensor array includes at least two photosensor arrays respectively configured and arranged to detect the light rays at the different angles using at least two light paths respectively including different microlenses in the microlens array.

6. The apparatus of claim 1, wherein the logic circuit is configured and arranged to construct a deconvolved volume image using data provided by each of the photosensor arrays.

7. An apparatus comprising:
objective lens;
a microlens array; and
a photosensor array including respective sets of photosensors configured and arranged to
detect light rays received at different angles from a specimen via the objective lens and microlens array, the light rays detected by each set of photosensors representing an aliased view of the specimen, and
provide an output indicative of aliased views of the specimen; and
a logic circuit configured and arranged with the photosensor array to reconstruct a deconvolved volume image of the specimen, including information indicative of at least one of position and depth in the specimen, by combining the aliased views detected by the sets of photosensors based upon overlapping light rays from the different angles in the volume, the logic circuit being further configured and arranged with the photosensor array to encode a forward projection of the deconvolved volume image to a four-dimensional light field image that varies as a function of position and depth in the volume image.

8. An apparatus comprising:
objective lens;
a microlens array; and
a photosensor array including respective sets of photosensors configured and arranged to
detect light rays received at different angles from a specimen via the objective lens and microlens array, the light rays detected by each set of photosensors representing an aliased view of the specimen, and
provide an output indicative of aliased views of the specimen; and
a logic circuit configured and arranged with the photosensor array to reconstruct a deconvolved volume image of the specimen, including information indicative of at least one of position and depth in the specimen, by combining the aliased views detected by the sets of photosensors based upon overlapping light rays from the different angles in the volume, and the logic circuit being further configured and arranged with the photosensor array to increase, by combining data indicative of overlapping light rays, an effective spatial sampling rate of the deconvolved volume image up to a limit set by the diffraction of light and the effective spatial and angular sampling rate of the apparatus.

9. An apparatus comprising:
respective sets of photosensors configured and arranged to
  detect light rays received at different angles from a specimen via different microlenses, the light rays detected by each set of photosensors representing an aliased view of the specimen, and
  provide an output indicative of aliased views of the specimen; and
a logic circuit connected to the photosensors and to receive the output indicative of the aliased views of the specimen, the logic circuit being configured and arranged to reconstruct a deconvolved volume image of the specimen by combining the aliased views detected by the sets of photosensors based upon overlapping light rays from the different angles in the volume, and angles at which the respective light rays are received at the photosensors; and
wherein the logic circuit is configured and arranged to reconstruct the deconvolved volume image by using the light rays and an irregular overlapping pattern of the light rays to increase an effective spatial sampling rate of the light rays relative to an actual sampling rate at which the photosensor detects the light rays.

10. An apparatus comprising:
objective lens;
a microlens array; and
a photosensor array including respective sets of photosensors configured and arranged to
  detect light rays received at different angles from a specimen via the objective lens and microlens array, the light rays detected by each set of photosensors representing an aliased view of the specimen, and
  provide an output indicative of aliased views of the specimen; and
a logic circuit configured and arranged with the photosensor array to reconstruct a deconvolved volume image of the specimen, including information indicative of at least one of position and depth in the specimen, by combining the aliased views detected by the sets of photosensors based upon overlapping light rays from the different angles in the volume and further configured and arranged to reconstruct the deconvolved volume image by using the overlapping light rays to mitigate out of focus characteristics of the respective images upon reconstruction of the deconvolved volume image by combining respective out of focus images detected by each of the photosensors, wherein images detected by each set of photosensors are out of focus.

11. An apparatus comprising:
objective lens;
a microlens array;
a photosensor array including respective sets of photosensors configured and arranged to
  detect light rays received at different angles from a specimen via the objective lens and microlens array, the light rays detected by each set of photosensors representing an aliased view of the specimen, and
  provide an output indicative of aliased views of the specimen; and
a logic circuit configured and arranged with the photosensor array to reconstruct a deconvolved volume image of the specimen, including information indicative of at least one of position and depth in the specimen, by combining the aliased views detected by the sets of photosensors based upon overlapping light rays from the different angles in the volume; and
wherein the microlens array includes a plurality of microlenses and a coating on at least a portion of each microlens, the logic circuit being configured and arranged with the microlenses and respective coating on each lens to reconstruct the deconvolved volume image by localizing point sources, using each coating to decrease the effective width of backprojected light rays by blocking a portion of the light rays.

12. A method comprising:
detecting, via respective sets of photosensors, light rays received at different angles from a specimen via an objective lens and microlens array, the light rays detected by each set of photosensors representing an aliased view of the specimen;
providing an output indicative of aliased views of the specimen useful for processing by a logic circuit; and
reconstructing a deconvolved volume image of the specimen by combining ones of the aliased views based upon overlapping light rays from the different angles in the volume, and the angles at which the overlapping light rays are detected, including the step of using the overlapping light rays to increase an effective spatial sampling rate of the light rays relative to an actual sampling rate at which the light rays are detected, with the light rays overlapping on the photosensors in an irregular pattern in which different ones of the light rays are spaced from one another at different distances.

13. The method of claim 12, wherein reconstructing the deconvolved volume image includes increasing, by combining data indicative of overlapping light rays, an effective spatial sampling rate of the deconvolved volume image up to a limit set by the diffraction of the light rays and the effective spatial and angular sampling rate at which the light rays are detected.

14. The method of claim 12, wherein the specimen is predominantly transparent to light emitted therethrough; and wherein detecting the light rays includes detecting respective sets of light rays at different angles using at least two light paths respectively including different microlenses in the microlens array, and reconstructing the deconvolved volume image includes using aliased views corresponding to light rays detected via each of the light paths.

15. A method comprising:
detecting, via respective sets of photosensors, light rays received at different angles from a specimen via an objective lens and microlens array, the light rays detected by each set of photosensors representing an aliased view of the specimen;
providing an output indicative of aliased views of the specimen useful for processing by a logic circuit;
reconstructing a deconvolved volume image of the specimen by combining ones of the aliased views based upon overlapping light rays from the different angles in the volume, and the angles at which the overlapping light rays are detected; and
encoding a forward projection of the deconvolved volume image to a four-dimensional light field image that varies as a function of position and depth in the volume.

16. A method comprising:

detecting, via respective sets of photosensors, light rays received at different angles from a specimen via an objective lens and microlens array, the light rays detected by each set of photosensors representing an aliased view of the specimen, wherein detecting light rays includes detecting light rays that are out of focus;

providing an output indicative of aliased views of the specimen useful for processing by a logic circuit;

reconstructing a deconvolved volume image of the specimen by combining ones of the aliased views based upon overlapping light rays from the different angles in the volume, and the angles at which the overlapping light rays are detected; and using the overlapping light rays to mitigate out of focus characteristics of the deconvolved volume image by combining the respective out of focus images detected by the photosensors.

* * * * *